United States Patent [19]

Timte et al.

[11] Patent Number: 5,389,046

[45] Date of Patent: Feb. 14, 1995

[54] AUTOMATIC TRANSMISSION CONTROL SYSTEM

[75] Inventors: Frank W. Timte, Canton; Ralph C. Bolz, Livonia, both of Mich.

[73] Assignee: Ford Motor Company, Dearborn, Mich.

[21] Appl. No.: 66,826

[22] Filed: May 25, 1993

[51] Int. Cl.⁶ .............................................. F16H 61/08
[52] U.S. Cl. ..................................... 475/127; 475/146
[58] Field of Search ................. 475/116, 128, 129, 146

[56] References Cited

U.S. PATENT DOCUMENTS

| | | | |
|---|---|---|---|
| 3,996,817 | 12/1976 | Winzeler | 475/146 |
| 4,224,837 | 9/1980 | Croswhite | 475/127 |
| 4,628,771 | 12/1986 | Person et al. | 475/146 |
| 4,805,750 | 2/1989 | Nitz | 192/3.58 |
| 4,875,391 | 10/1989 | Leising et al. | 74/866 |
| 4,938,097 | 7/1990 | Pierce | 475/72 |
| 5,029,087 | 7/1991 | Cowan et al. | 364/424.1 |
| 5,086,670 | 2/1992 | Nitz et al. | 74/866 |
| 5,150,297 | 9/1992 | Daubenmier et al. | 364/424.1 |
| 5,157,608 | 10/1992 | Sankpal et al. | 364/424.1 |
| 5,188,570 | 2/1993 | Wakahara | 475/143 |
| 5,232,411 | 8/1993 | Hayashi et al. | 475/146 |
| 5,288,279 | 2/1994 | Sakai et al. | 475/127 |
| 5,315,898 | 5/1994 | Koyama et al. | 475/330 |

Primary Examiner—Dirk Wright
Attorney, Agent, or Firm—Roger L. May; Frank G. McKenzie

[57] ABSTRACT

A hydrokinetic, multiple-ratio torque converter transmission mechanism having a simplified valve system with variable force solenoids for controlling line pressure as well as ratio shifts, a simplified clutch-and-brake hydraulic circuit with separate fluid pressure feed and exhaust passages, a common accumulator arrangement for controlling each of two ratio upshifts and a simplified brake servo mechanism having the dual function of establishing a torque reaction point for each of two distinct transmission ratios.

15 Claims, 28 Drawing Sheets

| GEAR | RC | CC | FC | DC | L/R | 2/4 | OWC2 DR | OWC2 C | OWC1 DR | OWC1 C | RATIO | COAST BRAKING |
|---|---|---|---|---|---|---|---|---|---|---|---|---|
| M-1st |  | X | X |  | X |  | X | - | X | - | 2.889 | YES |
| M-2nd |  | X | X |  |  | X | X | - | OR | OR | 1.571 | YES |
| M-3rd |  | X | X | X |  |  | X | - | OR | OR | 1.000 | YES |
| 1st |  |  | X |  |  |  | X | OR | X | OR | 2.889 | NO |
| 2nd |  |  | X |  |  | X | X | OR | OR | OR | 1.571 | NO |
| 3rd |  |  | X | X |  |  | X | OR | OR | OR | 1.000 | NO |
| 4th |  |  | X | X |  | X | O | OR | OR | OR | .689 | YES |
| REV | X |  |  |  | X |  | - | - | - | - | 2.310 | YES |

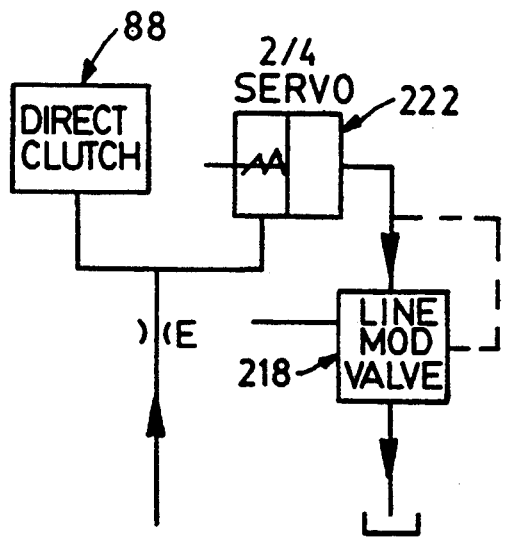
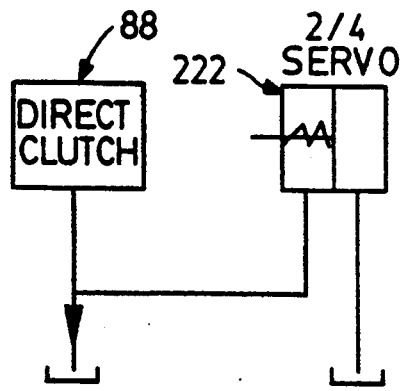
FIG-29A  FIG-29B
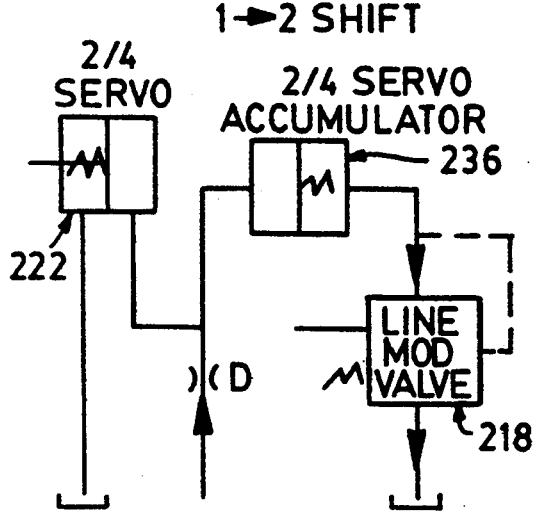
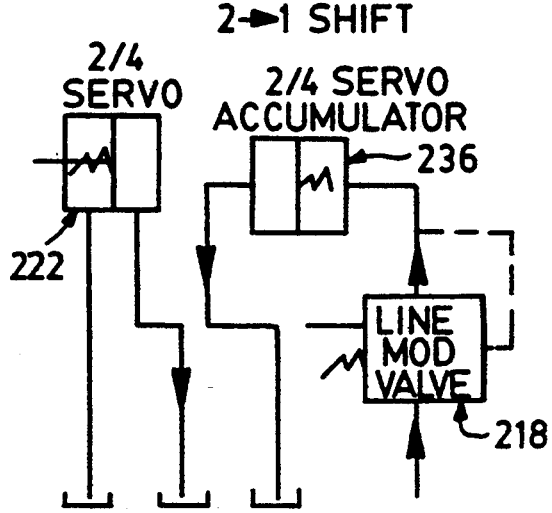
FIG-31A  FIG-31B

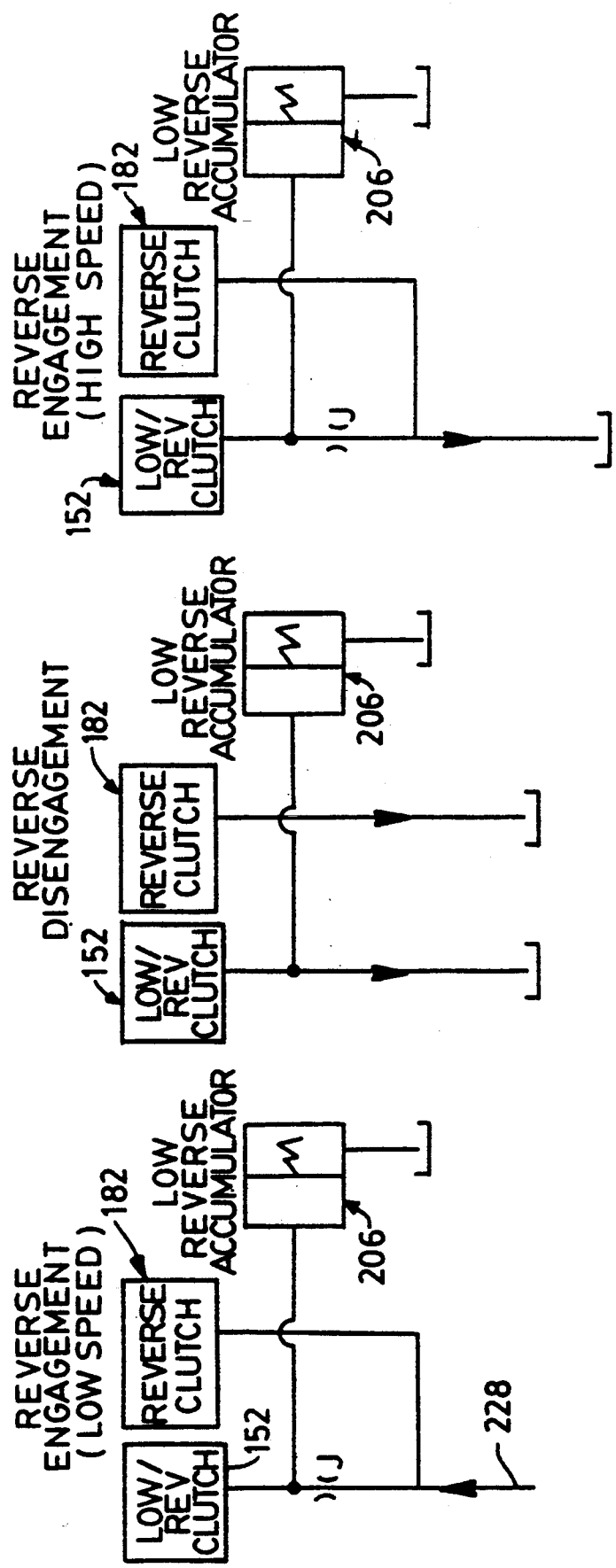

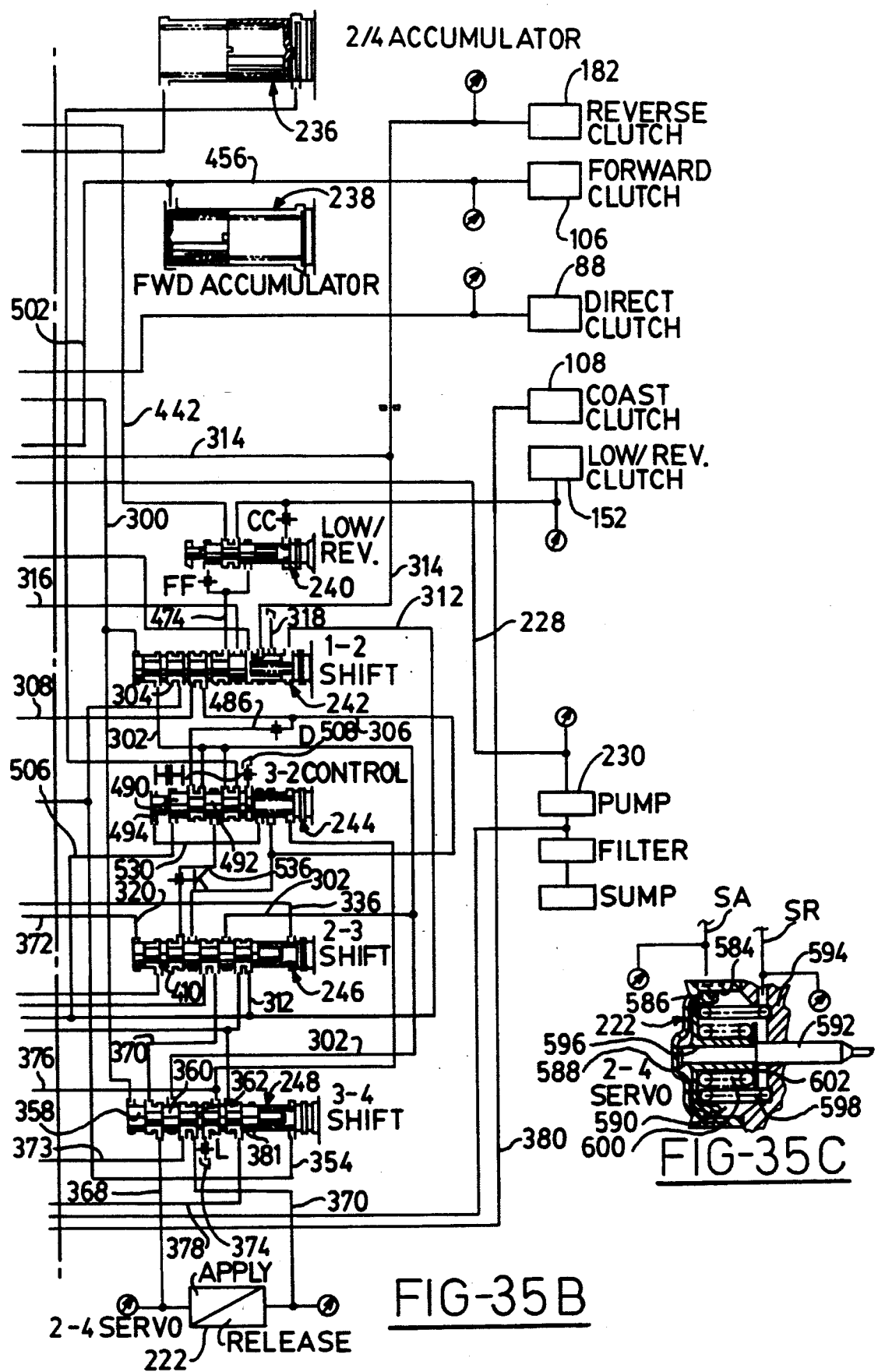

5,389,046

AUTOMATIC TRANSMISSION CONTROL SYSTEM

TECHNICAL FIELD

A multiple ratio automatic transmission mechanism having a simplified valve system and simplified ratio controlling clutches and brakes that adapt an automotive vehicle driveline for all operating demands with a minimum number of control elements and with reduced driveline space requirements.

BACKGROUND OF THE INVENTION

Our invention relates to improvements in a valve system of the kind shown in U.S. Pat. No. 4,938,097, issued to Stanley L. Pierce, which is assigned to the assignee of our present invention. Our invention includes features that are common to the invention described in U.S. Pat. No. 5,157,608, issued to B. G. Sankpal, J. A. Daubenmier, L. J. Kurdziel, J. F. Carnago, W. Lewis, Jr., and R. S. Williams. The '608 patent also is assigned to the assignee of the present invention.

The '608 patent describes a control system having a microprocessor that establishes optimum control pressure levels for fluid pressure operated clutches and brakes that are used to effect ratio changes, whereby optimum clutch and brake servo pressures are maintained for each ratio change as torque capacity of an off-going clutch or brake is reduced in synchronism with the increase in torque capacity of an oncoming clutch or brake.

Our invention includes also features that are common to the invention of U.S. Pat. No. 5,150,297, issued to J. A. Daubenmier, P. A. Baltusis, R. T. Cowen, J. E. El-Khoury, and R. S. Williams. The '297 patent also is assigned to the assignee of our present invention. It describes a valve system for controlling ratio shifts in a transmission control system that includes a microprocessor and that responds to sensed variables including engine speed, vehicle speed and driver actuated range selector position, thus enabling the control system to adjust to varying road speed, engine torque and road conditions with high quality shift performance.

The hydrokinetic torque converter of our invention has a bypass clutch controlled by the valve system. The bypass clutch has features that are common to the control system described in U.S. Pat. No. 5,029,087, (issued to R. T. Cowen, R. L. Huffmaster and P. K. Jain), and to the hydrokinetic torque converter control system of pending U.S. patent application Ser. No. 927,046, filed by B. J. Palansky, T. L. Greene, J. A. Daubenmier, G. F. McCall, L. H. Buch and P. E. Smith on Aug. 10, 1992. That copending patent application also is assigned to the assignee of our present invention. The disclosure of the co-pending application describes a torque converter control system having a lock-up clutch for establishing a controlled mechanical torque flow path between the engine and the transmission gearing and for modifying the bypass clutch capacity during shift intervals.

BRIEF DESCRIPTION OF THE INVENTION

The improved valve system of our invention includes a simplified valve arrangement for controlling the application and release of clutches and brakes in a multiple ratio gear system. Separate variable force solenoid valves are used in the control system, one of which controls line pressure and the other of which has the ability to control a 3-2 downshift by regulating the exhaust pressure from a clutch that establishes third ratio operation. The second variable force solenoid also controls the ability of the transmission system to accommodate coast torque when coast braking is required.

The valve system of our invention has a simplified orifice arrangement whereby the rate of delivery of pressure fluid to the transmission clutches and brakes is controlled by calibrated orifices and whereby fluid is exhausted from the clutches and brakes during ratio changes through a separate exhaust flow path that is distinct from the pressure feed passages for the same clutches and brakes.

A manual valve, under the control of the vehicle operator, assumes a reverse drive position to condition a reverse drive clutch and a low-and-reverse brake for reverse drive. The manual valve then directs line pressure to the low-and-reverse brake and to a parallel low-and-reverse accumulator through a low-and-reverse modulator valve. The fluid pressure is directed to the reverse clutch through an unrestricted passage. The reverse clutch is connected to the accumulator and the low-and-reverse brake through a calibrated feed orifice. This ensures that reverse clutch will engage prior to application of the low-and-reverse brake, thereby providing consistent reverse drive engagements.

Our improved valve system also has a single servo for applying a common brake that is used during a 1-2 upshift and a 3-4 upshift, the servo being applied for a 1-2 upshift, released during a 2-3 shift and reapplied for a 3-4 shift. A single accumulator is used for cushioning both the 1-2 upshift and a 3-4 upshift.

Our improved control system also includes means for conditioning the transmission system for operation in either second gear or third gear in the event of a supply voltage interruption that prevents the use of the shift solenoids and the variable force solenoids.

A single timing valve is used for controlling both the power-on downshift from third ratio to second ratio and a power-off ratio change from the third ratio to the second ratio, thus providing optimum shift synchronization.

BRIEF DESCRIPTION OF THE DRAWINGS

FIGS. 29A and 29B show the hydraulic shift feel logic for a 1-3 shift and a 3-1 shift, respectively;

FIGS. 31A and 31B show the hydraulic shift feel logic for a 1-2 shift and a 2-1 shift, respectively;

FIGS. 34A, 34B and 34C show the shift feel logic for reverse engagement at low speed, reverse disengagement and reverse engagement at high speed, respectively;

FIGS. 35A and 35B, taken together, show the overall valve arrangement which is illustrated in the previous figures;

FIG. 35C is a cross-sectional schematic view of the 2-4 brake servo shown in block diagram form in FIG. 35B.

PARTICULAR DESCRIPTION OF THE INVENTION

Torque Flow Elements

Figure 1:
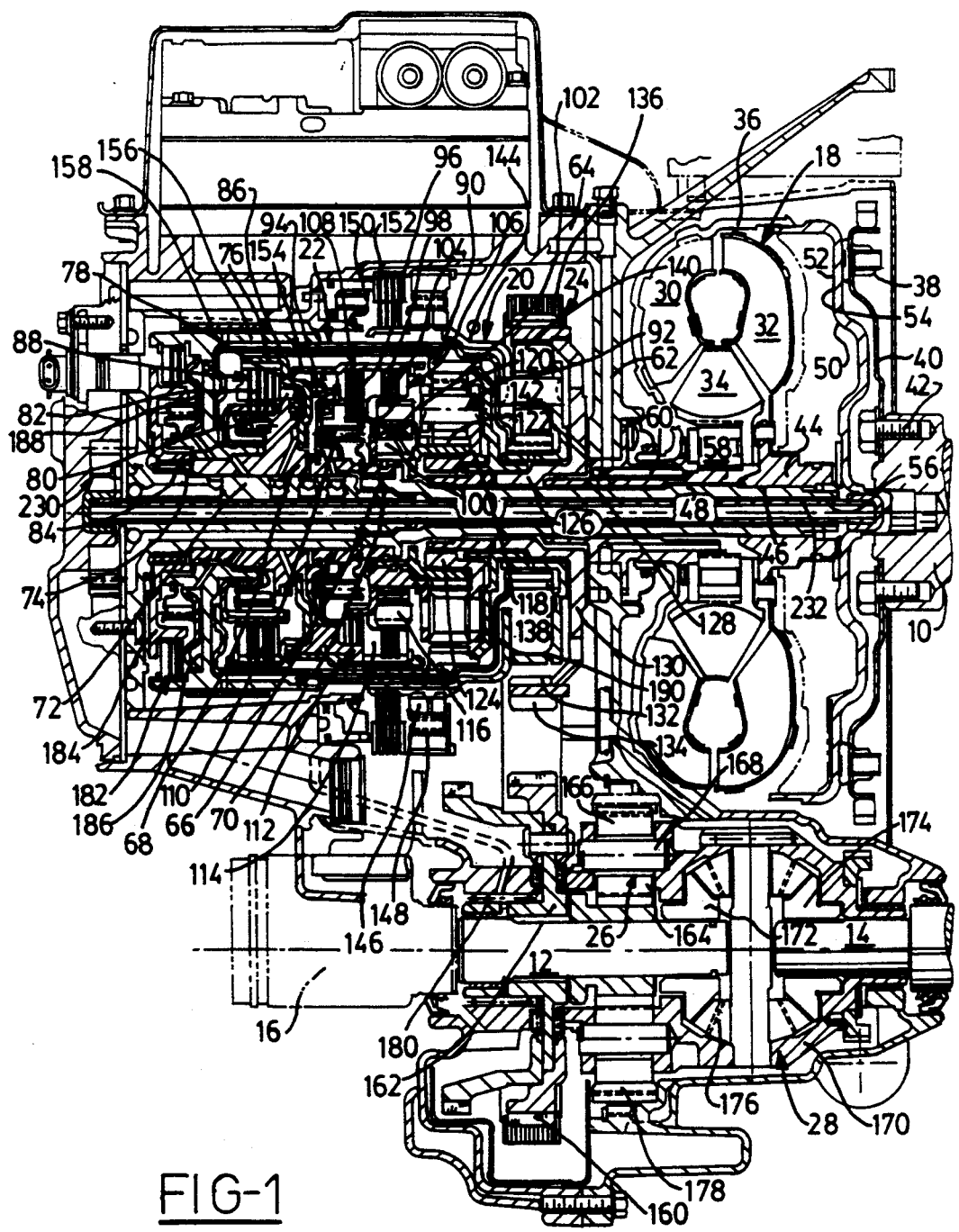
FIG. 1 is a cross-sectional assembly view of a four-speed ratio transaxle for use in an automotive vehicle driveline which is capable of embodying the improved control system of our invention.

In FIG. 1, numeral 10 designates the crankshaft of an internal combustion engine in the automotive vehicle driveline. Numeral 12 and numeral 14 designate torque output shafts that in turn are connected to axle half shafts by means of universal joints, one of which is shown at 16 in FIG. 1. The half shafts are connected to vehicle traction wheels.

The principal components of the assembly of FIG. 1 are hydrokinetic torque converter 18, multiple ratio gearing 20, clutch-and-brake structure 22 for controlling the ratio changes in the gearing 20, torque transfer drive 24, final drive gear assembly 26 and differential and axle assembly 28. structure of FIG. 1 will be described only generally since reference may be made to the previously mentioned patent of Stanley L. Pierce, U.S. Pat. No. 4,938,097, for a particular description of the transmission gearing.

The hydrokinetic torque converter 18 includes a bladed impeller 30, a bladed turbine 32 and a bladed stator 34. These elements are arranged in toroidal fluid flow relationship in a conventional manner. Impeller 30 comprises an impeller shell 36 that is connected drivably at 38 to a drive plate 40. Crankshaft 10 is connected by bolts 42 to the hub of the drive plate 40.

Turbine 32 includes a turbine hub 44, which is splined at 46 to turbine sleeve shaft 48. A torque converter bypass clutch plate 50 is located within the impeller shell 36 adjacent turbine 32. It carries friction member 52, which is adapted to frictionally engage annular surface 54 on the interior of the impeller shell 36. The hub of bypass clutch plate 50 is splined to the turbine hub 44.

The bypass clutch plate 50 cooperates with the radial wall of the impeller shell 36 to define a bypass clutch control pressure cavity, which communicates with annular bypass control pressure passage 56 formed in the turbine sleeve shaft 48. When the pressure in the toroidal circuit within the impeller shell 36 exceeds the pressure in the bypass clutch control pressure cavity, the bypass clutch becomes engaged thereby connecting the impeller 30 and the turbine 32 to establish a mechanical torque flow path.

Stator 34 is mounted on a one-way brake 58, which is comprised of an inner race splined to a stationary sleeve shaft 60 forming a part of radial stator support wall 62. Wall 62 forms a part of the transmission housing, generally identified by reference numeral 64.

Turbine sleeve shaft 48 is splined at 66 to clutch and brake sleeve shaft 68. The left end of the turbine shaft 48 is journalled at 70 to an inboard end of stationary support sleeve 72, which forms a part of the housing 64. The left end of the clutch and brake sleeve shaft 68 is journalled at 74 on the sleeve 72.

A clutch drum 76 is connected by radial clutch member 78 to the sleeve shaft 68. It defines an annular cylinder that receives direct clutch piston 80. Direct clutch discs 82 carried by the drum 76 cooperate with clutch discs carried by clutch member 84, which in turn is connected to torque transfer drum 86. Thus, when the direct clutch piston is pressurized, the discs of the direct clutch, identified generally by reference character 88, become engaged thereby connecting the sleeve 68 and the turbine shaft 48 to the member 86. The right end of the member 86 is connected to ring gear 90 of a first simple planetary gear unit 92, which forms a part of the gearing 20.

The drum 76, the sleeve 68 and the radial member 78 cooperate to define a forward clutch cylinder that receives a forward clutch piston 94. Coast clutch friction discs 96 are carried by drum 76. Cooperating coast clutch discs are carried by clutch member 98, which is secured to the inner race 100 of an overrunning coupling 102. The outer race of the coupling 102 carries forward clutch discs 104, which register with forward clutch discs carried by the drum 76.

The forward clutch is identified generally by reference numeral 106, and the coast clutch is identified generally by reference numeral 108. When the piston 94 is pressurized, the forward clutch discs 104 become frictionally engaged, thereby establishing a driving connection between the outer race of the overrunning coupling 102 and the clutch drum 76. The piston 94 defines a cylinder in which is received a coast clutch piston 110. The piston 110, when it is pressurized, acts on the friction discs 96, thereby establishing a mechanical frictional drive connection between the inner race 100 and the clutch drum 76.

The clutch drum carries separator plates that register with the friction discs 104, and extension 112 on the piston 110 extends through apertures in the separator plates so that when the forward clutch is pressurized, the piston 94 will exert a clutch engaging force on pressure plate 114 which applies the forward clutch and establishes a frictional driving connection between clutch drum 76 and the outer race 116 of overrunning coupling 102.

The planetary gear unit 92 includes a carrier 118 which supports pinions 120. The pinions 120 mesh with ring gear 90 and sun gear 122. Sun gear 172 is journalled on the hub 124 of the carrier 118, which is connected by a spline to the inner race 100 of the coupling 102.

Carrier 118 is splined to sleeve shaft 126, which is journalled on bearing support 128 formed on the housing 64. A radial drive plate 130 formed integrally with the sleeve 126 carries ring gear 132. The outer periphery of ring gear 132 is formed with sprocket teeth 134 over which is trained a drive chain 136. Ring gear 132 and sun gear 138 mesh with pinions 140 journalled on the carrier 142. Drive member 144 connects the carrier 142 to the inner race 146 of an overrunning brake 148. The outer race of the overrunning brake 148 is fixed to the housing 64.

The housing defines an annular cylinder which receives annular brake piston 150. Friction discs are carried by the member 144. These register with separator plates carried by the housing 64. The separator plates and the disc define a low and reverse friction brake 152, which is arranged in parallel disposition with respect to the overrunning brake 148.

Sun gear 138 is connected by a torque transfer member 154 to brake drum 156, which is surrounded by 2-4 brake band 158. The 2-4 brake band is applied and released by a fluid pressure operated servo which will be described subsequently with reference to FIG. 35C. Ring gear 90 is connected to torque transfer member 86, thus connecting the clutch member 68 to the ring gear 90 when the direct clutch 88 is applied.

The final drive gear assembly 26 comprises a driven gear 160, which is connected to ring gear 132 by the drive chain 136. Gear 160 has a hub 162 which is connected directly to sun gear 164 of the final drive gear assembly 26. Planetary pinions 166 of the gear assembly 26 are journalled on carrier 168, which is connected drivably to differential carrier 170 of the differential assembly 28. A first side gear 172 of the differential assembly 28 is splined to axle half shaft 12 and a companion side gear 174 is splined to the other axle half shaft 14. Carrier 170 journals differential pinions 176 which engage drivably the side gears 172 and 174. Pinions 166 engage ring gear 178 which is fixed to the housing and which acts as a reaction point. Torque is delivered to the sun gear 164 from the driven gear hub 162. The latter being journalled by bearing 180 on the transmission housing.

A reverse clutch shown generally at 182, and separator plates are splined to brake drum 156. These register with friction discs carried by clutch member 84, which is splined to the clutch sleeve 68. The brake drum defines a clutch cylinder 186, which receives reverse clutch piston 188. When pressure is admitted to cylinder 186, piston 188 engages the reverse clutch 182, thereby drivably connecting clutch sleeve member 68 with the brake drum 156.

Figures 25, 26:
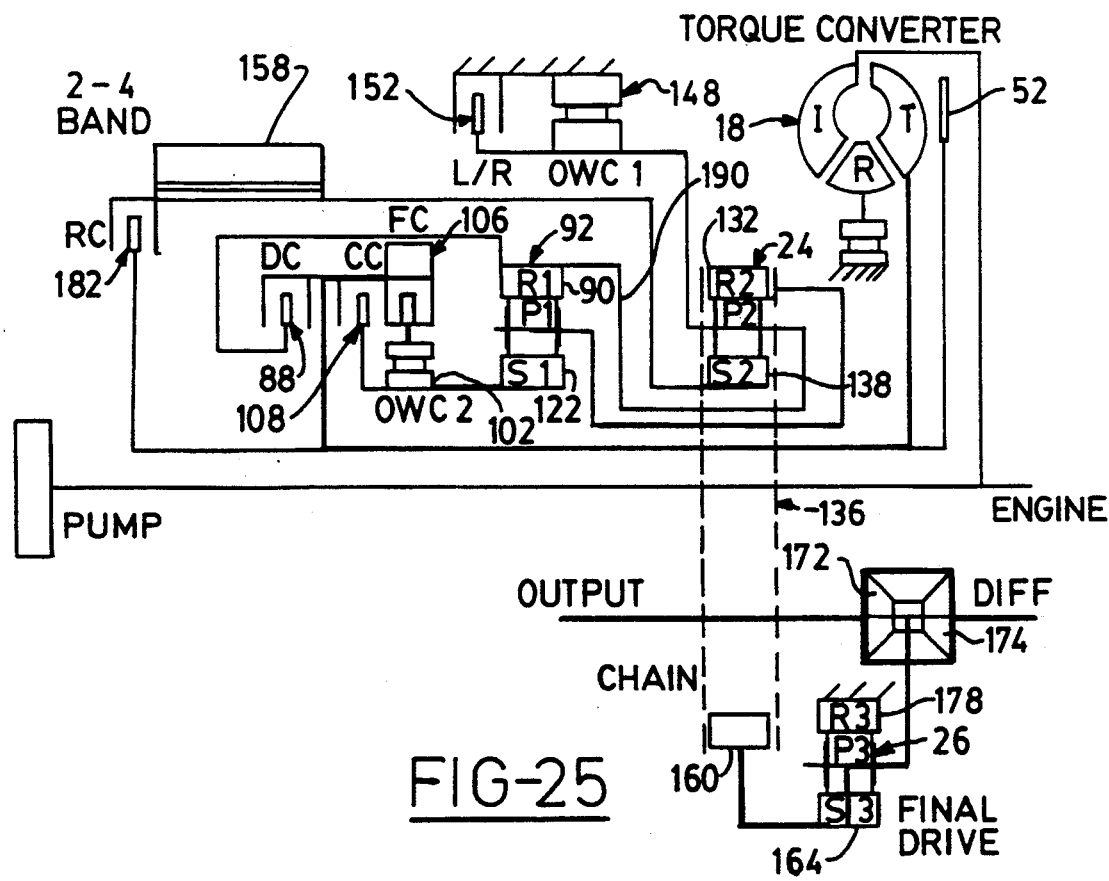
FIG. 25 is a schematic representation of the overall transmission mechanism illustrated in cross-sectional form in FIG. 1.
FIG. 26 is a chart showing the clutch-and-brake engagement and release pattern for establishing each of four forward driving ratios and a reverse ratio in the transmission mechanism of FIGS. 1 and 25.

The transmission mechanism illustrated in FIG. 1 is capable of providing four forward driving ratios and a single reverse ratio as the clutches and brakes are applied and released. This can best be described with reference to the schematic diagram of FIG. 25 and with reference to the chart of FIG. 26. In FIG. 25, the clutches and brakes that are designated by reference numerals in FIG. 1 are identified FIG. 26 by the symbols "RC" for the reverse clutch 182, "CC" for the coast clutch 108, "FC" for the forward clutch 106, "DC" for the direct clutch 88, "L/R" for the low and reverse brake 152, "2/4" for the 2-4 band 158, "OWC2" for the overrunning coupling 102, and "OWC1" for the overrunning brake 148.

To establish first ratio operation, it merely is necessary to engage the forward clutch FC. Engine torque drives the impeller of the torque converter 18, thereby establishing a turbine torque which is distributed through the forward clutch FC and through the overrunning coupling OWC2 to the sun gear 122. The ring gear 90 is connected through the torque transfer member 190 to the carrier 142 of the gear unit 24, which is anchored to the housing by overrunning brake 148. Thus, the ring gear acts as a reaction member as torque is delivered through the forward clutch to the sun gear 122. The carrier for the gear unit 92 then is driven and carrier torque is transferred to ring gear 32 for the gear unit 24, which drives the driven gear 160. Torque then is transferred to the final drive sun gear 164 with the ring gear 178 acting as a reaction point. The carrier of the differential mechanism is driven, thus transferring torque to each side gear 172 and 174.

In the schematic drawing of FIG. 25, the sun gear 122 and the ring gear 90 are identified by symbols S1 and R1, respectively. Similarly, sun gear 138 and ring gear 132 are identified by the symbols S2 and R2, respectively. The final drive sun gear 164 and final drive ring gear 178 carry the symbols S3 and R3, respectively.

If manual low operation is desired, coast braking can be achieved. This requires the engagement of the low and reverse brake L/R and the engagement of the coast clutch CC. This effectively bypasses the overrunning couplings OWC1 and OWC2, respectively, thereby permitting coast torque to be transferred from the axle half shafts to the engine.

Forward drive operation in the second ratio is obtained by keeping the forward clutch applied and by engaging the 2-4 brake band. The engagement of the 2-4 brake band anchors sun gear S2. Turbine torque then is delivered through the forward clutch FC and through the overrunning coupling OWC2 to the carrier for gear unit 92 and to the ring gear R2 for gear unit 24. With the ring gear R2 acting as a torque input gear element and with the sun gear S2 being anchored, the ring gear R1 drives the carrier for gear unit 24 in a forward direction since the coupling OWC1 is released and overruns. Thus, the overall ratio is increased relative to the low ratio.

If coast braking is desired during operation in the low ratio, coast clutch CC is applied, as well as the forward clutch FC and the 2-4 brake band. A torque flow path around the coupling OWC2 then is established by the coast clutch, thereby permitting reverse torque flow through the gear system.

Third ratio operation in the forward drive range is obtained by simultaneously engaging forward clutch FC and direct clutch DC. Both the L/R brake and the 2-4 brake are released. Thus, all of the elements of the gearing are locked together for rotation in unison as torque is delivered from the turbine shaft through the locked- up gearing to the ring gear R2.

As in the case of operation in the first and second ratios, coast braking is possible in third gear by engaging the coast clutch CC, thus bypassing the overrunning coupling OWC2 and permitting reverse torque flow through the gear system.

Fourth ratio operation, which is an overdrive ratio, is achieved by engaging simultaneously the forward clutch FC and the 2-4 brake band, as well as the direct drive clutch DC. Since both the clutches DC and FC are applied, the torque is distributed directly through the gear unit 92, causing torque flow to pass from the carrier of gear unit 92 to the ring gear R2. The carrier for gear unit 24 walks around anchored sun gear S2. Thus, the overall ratio is less than one.

Reverse drive is obtained by engaging the reverse clutch RC and the low and reverse brake L/R. Driven torque is delivered through the engaged clutch RC directly to the sun gear S2. The carrier for the gear unit 24 is anchored by the low and reverse brake, thereby causing the ring gear 132 to be driven in a reverse direction.

CONTROL VALVE SYSTEM

Figure 35A:
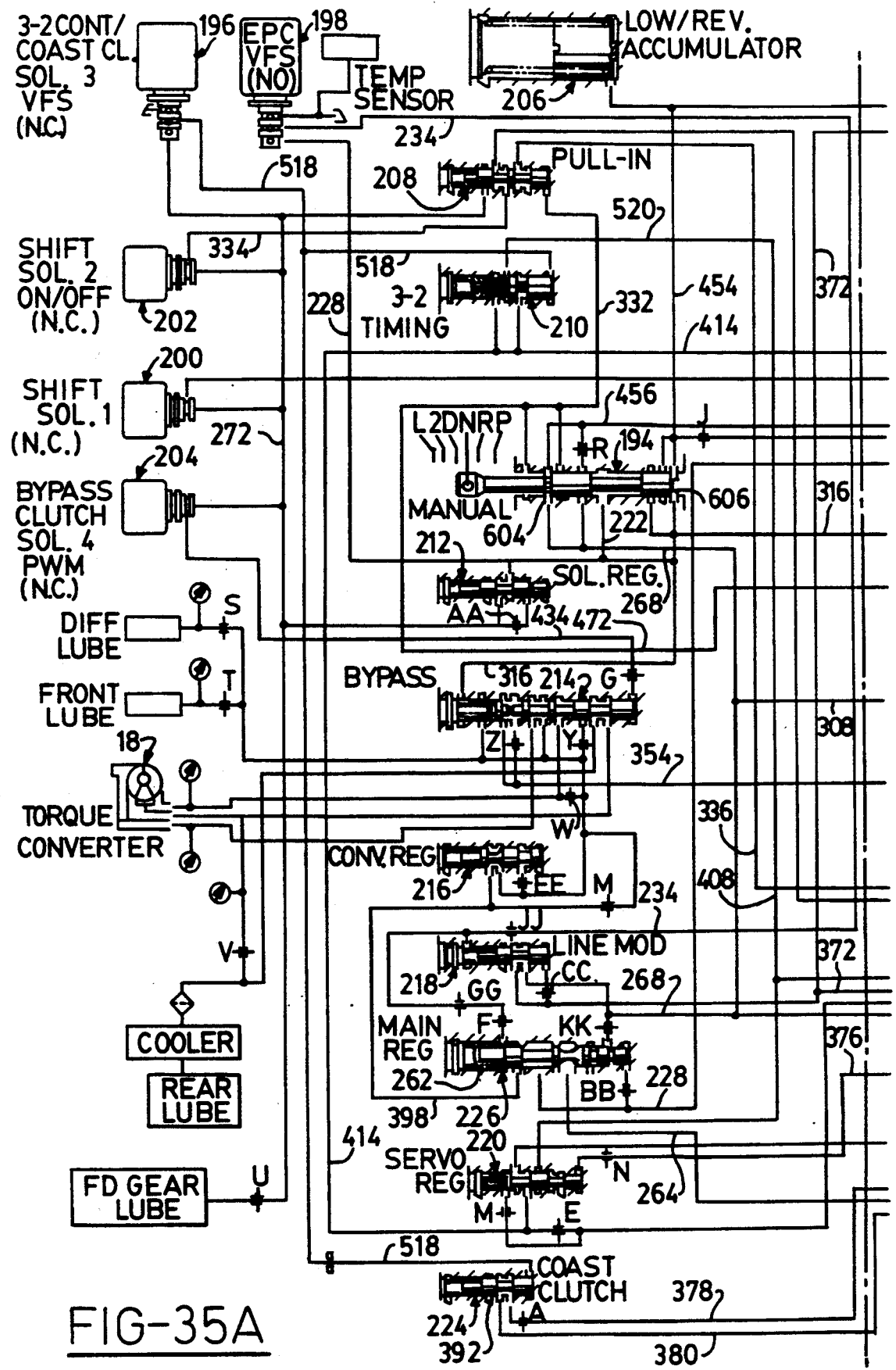

A schematic representation of the valve circuit for controlling the application and release of the clutches and brakes is illustrated in FIGS. 35A and 35B, taken together. The valve circuit consists of control pressure valve elements, a cooling circuit and a lubrication circuit, which are provided with fluid by a fixed displacement pump. The torque converter bypass clutch control shift scheduling and line pressure regulation are achieved electronically. The control includes a microprocessor that is integrated with the engine controls, thus making it possible to use a single processor for overall drive train control. The torque converter includes an electronically-controlled bypass clutch with a mechanical damper, as indicated in FIG. 1. The torque converter axial dimension for the toroidal circuit is 20 percent less than the radial dimension of the toroidal circuit, thus improving packaging efficiency.

The valve circuit includes a manual valve that has six shift quadrant positions; namely, park, reverse, neutral, drive, drive range 2 and low range 1. An overdrive cancel switch can be activated or deactivated to prevent automatic ratio changes to the fourth ratio. If the overdrive cancel switch is off, automatic 1-2 -3-4 upshifts and downshifts can be obtained. Coast braking is available only in fourth ratio, as indicated in the schematic diagram of FIG. 25 and the chart of FIG. 26. If the overdrive cancel switch is on, only first, second and third ratio automatic upshifts and downshifts are available. Coast braking is provided only in second and third ratios, depending upon whether the coast clutch is on or off.

When the manual valve is in the 2 position, the second ratio is held, although an automatic 1-2 upshift and a 2-1 downshift can be provided if that is desired. The L position of the manual valve results in a discrete first range drive mode. Manual low pull-in by the vehicle operator will provide second gear operation above 25 miles per hour and first gear operation at speeds lower than 25 miles per hour. After the transmission settles in the first gear ratio, it will remain in the first gear ratio regardless of vehicle speed.

Normal shift scheduling is controlled by the microprocessor and by normally closed three-way solenoids under the control of the microprocessor. The solenoids serve to actuate on/off hydraulic shift valves. Nonsynchronous upshifts from first to second ratio and from the third to fourth ratio are cushioned by an accumulator, which is common to both shifts. Downshift pressure control for the synchronous 3-2 downshift is controlled by a variable force solenoid and a regulator valve. Electronic line pressure control is used to modulate capacity during shifts.

If there is an interruption in the power supply for the microprocessor, when the transmission is in condition for operation in the D range or the 2 range, the transmission will shift to third gear with an open converter. Coast braking also is obtained under those conditions. Second gear operation under these conditions with engine braking can occur by moving the manual lever to the L position.

The valve elements of the control system are shown in FIGS. 35A and 35B. These include the manual valve 194, which can be adjusted by the vehicle operator to any one of the six operating positions described earlier.

Two variable force solenoid valves are shown at 196 and 198. Valve 198 is used to control line pressure. It produces a signal referred to in this description as TV pressure, and it distributes that pressure to the main regulator valve for adjusting the circuit pressure.

Variable force solenoid valve 196 has a dual function. The first of these is the control of the 3-2 downshift by regulating direct clutch exhaust pressure. The second function is the electronic control of the transmission coast braking as will be explained.

The circuit includes also three normally closed on/off solenoid valves; namely, shift solenoid 200 which establishes a signal for actuating the 1-2 shift valve, and second on/off solenoid valve 202 which develops a signal that controls the operation of the 2-3 shift valve. The third solenoid valve is a pulse with modulated bypass clutch control valve 204, which develops a signal that is applied to a bypass clutch solenoid valve.

Engagements from neutral to low and from neutral to reverse are controlled by a low reverse accumulator 206. A pull-in valve 208 is actuated by the manual valve 196 to achieve second ratio or low ratio operation in the event of a loss of control voltage.

Ratio changes between the third ratio and the second ratio are controlled by a 3-2 timing valve 210.

The solenoid valves are supplied with a regulated solenoid feed pressure by solenoid regulator valve 212.

The bypass clutch regulator valve 214, which is under the control of solenoid valve 204 as mentioned earlier, is used to control the pressure differential across the bypass clutch for the torque converter. The pressure in the converter is regulated by a converter regulator valve 216.

A line pressure modulator valve 218 provides shift feel pressure for all three upshifts. A servo release pressure regulator valve 220 controls the pressure on the release side of the 2-4 servo, indicated generally by reference character 222, which applies and releases the brake band 158.

The coast clutch CC is controlled by coast clutch valve 224. This valve is under the control of the 3-2 coast control solenoid valve 196, the latter regulating the supply pressure developed by the solenoid regulator valve 212 to produce a signal that is distributed to the coast clutch control valve.

Main regulator valve 226 is in fluid communication with line pressure passage 228. Pressure is supplied to line pressure passage 228 by pump 230 seen in the schematic drawing of FIG. 35B. Pump 230 also is shown generally in FIG. 1 at the left side of the housing 64. The pump 230 is a positive displacement pump, which is connected drivably by means of pump drive sleeve shaft 232 to the crank shaft 10, as seen in FIG. 1.

Main regulator valve 226 develops a circuit pressure for the clutches and the brake servo.

Main regulator valve 226 receives TV pressure from the variable force solenoid valve 198. TV pressure passage 234 connects variable force solenoid 198 with the main regulator 226. Main regulator 226 develops a circuit pressure that is proportional to the output signal in passage 234.

FIG. 35B shows the two accumulators. The first accumulator 236, which is labeled 2-4 accumulator, cushions the application of the 2-4 servo on both a 1-2 upshift and a 3-4 upshift. The second accumulator 238 is a forward clutch accumulator which cushions the application of the forward clutch 106 when the transmission is conditioned for a shift from neutral to forward drive.

A low reverse valve 240 modulates the line pressure made available to low and reverse clutch 152 when the transmission is conditioned for operation of the manual low drive range. The 1-2 shift valve 242 controls ratio changes from the first to the second ratio. It assumes the low range position to condition the transmission for operation in low and is shifted to an upshift position when the transmission is conditioned for operation in the second, third and fourth forward drive ratios.

A 3-2 control valve 244 makes it possible for the transmission to be shifted from third to second without stroking the accumulator 236. It exhausts the accumulator when the transmission is shifted from third to second, which allows the accumulator to stroke and to be conditioned for a ratio change to the fourth ratio. At that time, the 3-2 control valve is stroked to interrupt the exhaust flow path for the accumulator 236.

The 3-2 control valve 244 makes it possible to use a common accumulator for both the 1-2 upshift and the 3-4 upshift.

The 3-2 control valve is stroked by the pressure that is made available to the direct clutch, which moves the valve to a position that will introduce a control orifice in the exhaust flow path for the accumulator 236. Provision is made for latching the valve in that position when the transmission returns to the second ratio.

The 2-3 shift valve 246 controls ratio changes between the second ratio and the third ratio in response to a signal developed by the shift solenoid 202. The shift solenoid 200 controls the shifting movement of the 1-2 shift valve. The same signal that is used to control movement of the 3-4 shift valve 248 controls also ratio changes between the third ratio and the fourth ratio. Thus, the same shift solenoid can be used for controlling both shift valves 242 and 248, thereby simplifying the circuit.

Figure 2:
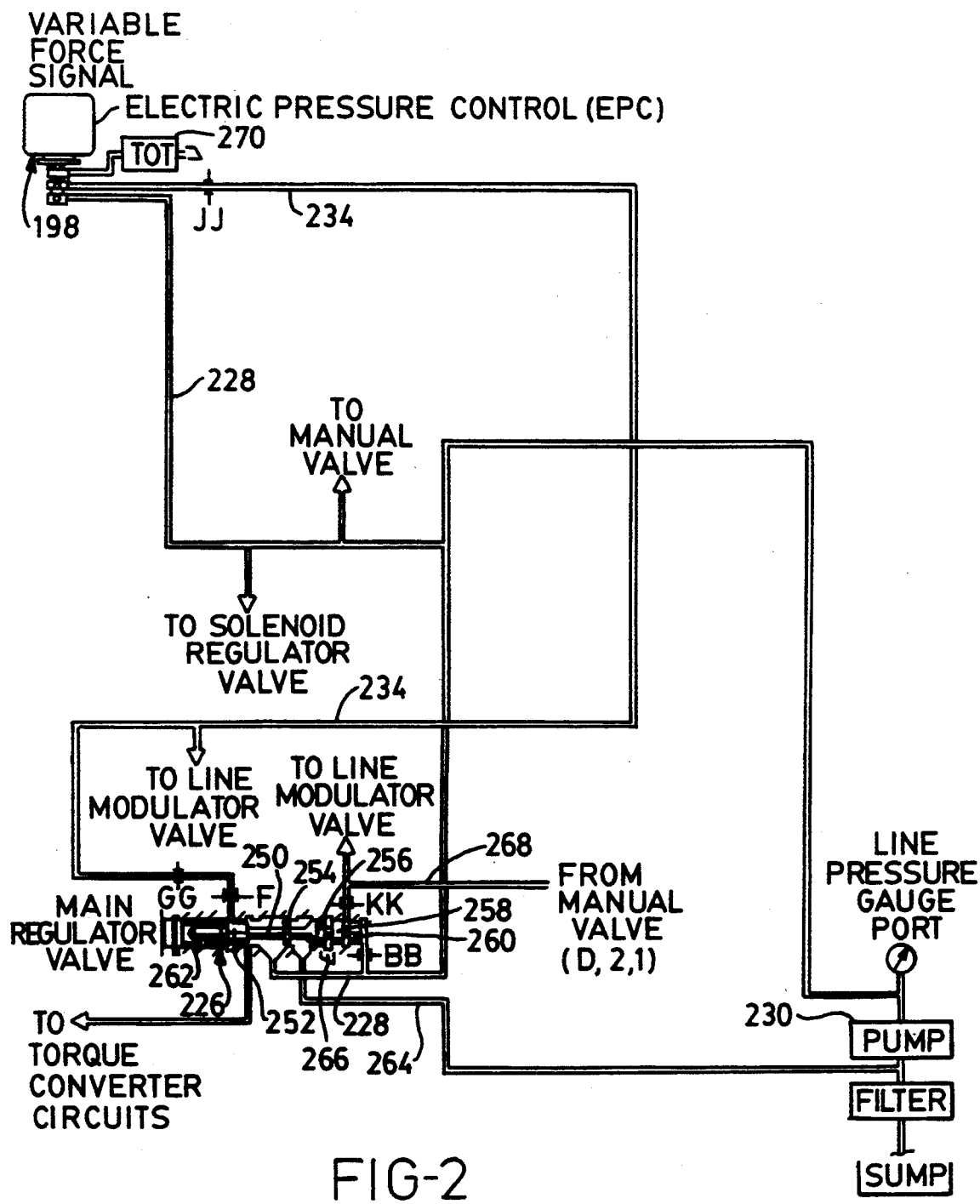
FIG. 2 is a partial assembly view of the control system showing the line pressure circuits for the transmission when it is operated in the drive range or in either the second or first manual range.

The line pressure circuit is shown in FIG. 2 isolated from the other elements for purposes of clarity. The electronic pressure control valve 198, as explained previously, communicates with line pressure passage 228 to establish a throttle pressure TV signal in passage 234. The line pressure is established by the main regulator valve which comprises a valve spool 250 with axially spaced valve lands 252, 254, 256. Spring 262 urges the valve spool 250 in the right-hand direction. This is opposed by the force of fluid pressure and line pressure line 228, which acts on the right end of the land 260. Return passage 264 communicates with the valve chamber for the valve spool 250 at a location between lands 252 and 254. It communicates with the return side of the pump 230.

Lands 256 and 258 have a differential diameter. The space between these lands communicates with exhaust port 266. Lands 250 and 260 also have a differential diameter defining a pressure area that is directed to a modulated line pressure developed by the line modulator valve 218, not shown on FIG. 2. The modulated line pressure is distributed to passage 268, which extends to the 2-3 shift valve and to the 3-4 shift valve.

Line pressure passage 228 also communicates with the solenoid regulator valve 212 which establishes a solenoid feed pressure, as will be explained subsequently. Line pressure passage 228 also feeds the manual valve 194, as will be explained subsequently.

Changes in the value of the TV pressure in passage 234 will result in a change in the regulated pressure in the line pressure passage 228. The microprocessor varies the current supplied to the solenoid valve 198. The fluid exhaust at the electronic pressure control valve 198 flows to transmission oil temperature sensor 270.

When the transmission is conditioned for automatic drive range D, the manual 2 position or the manual 1 position, fluid pressure in passage 268 causes the line pressure to operate in a lower pressure range because that pressure acts on the differential area of lands 258 and 260. When the transmission is operated in park, neutral or reverse, however, passage 268 is not pressurized. This results in a higher regulated line pressure that is maintained by the main regulator valve 226.

Figure 3:
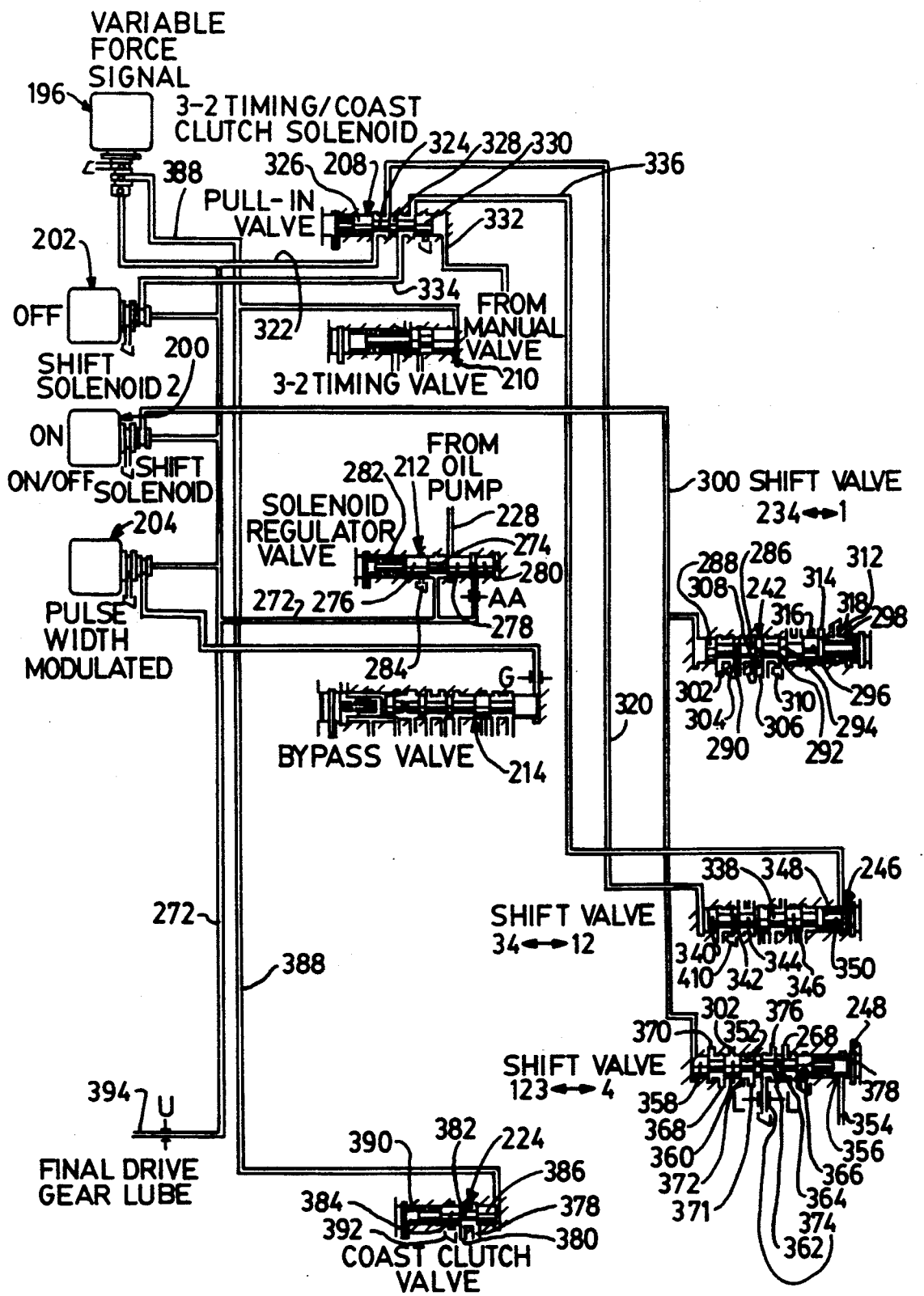
FIG. 3 is a partial assembly view of the valve system of our invention showing the solenoid circuits for manual first gear operation.

In FIG. 3, we have shown the solenoid circuits for the transmission when the transmission is conditioned for first gear operation. The solenoids 200, 202 and 204 are fed with pressure through solenoid feed passage 272. Passage 272 communicates with the solenoid regulator valve 212, which comprises a valve spool 274 with three-space valve lands 276, 278 and 280. A valve spring 282 urges the valve spool 274 in the right-hand direction. Line pressure passage 228 communicates with the valve chamber for the valve spool 274 at a location between lands 276 and 278. Solenoid feed passage 272 is located between lands 276 and 278. The pressure in passage 272 acts on the feedback pressure area defined by lands 278 and 280. The magnitude of the pressure in passage 272 is determined by the calibration of the valve and the spring rate for the spring 282. Exhaust port 284 for the valve 212 is located adjacent land 276.

The regulated pressure in passage 272 is supplied to each of the four solenoid valves 196, 202, 200 and 204. The microprocessor controls the solenoid valves 200 and 202 for initiating movement of the shift valves to provide operation in the first, second, third and fourth ratios. The processor also controls the 3-2 timing coast clutch solenoid 196 and the torque converter solenoid valve 204. The bypass clutch valve 214 thus is able to function to apply and release the torque converter clutch, as well as to establish modulation of the torque converter clutch.

Ratio changes between the first and second ratios are achieved by the movement of the 1-2 shift valve 242, which comprises a valve spool 286 having valve lands 288, 290, 292, 294 and 296. The spool is urged in the left-hand direction by the valve spring 298. As explained previously, when a shift signal in signal passage 300 is developed by the shift solenoid valve 200 under the control of the processor. When the valve spool 286 is shifted to the right, lands 288 and 290 establish communication between passage 302 and exhaust port 304. Passage 302 is pressurized when the transmission is conditioned for operation in the second, third and fourth ratios. When the transmission is downshifted to the first ratio, passage 302 acts as an exhaust flow path for the 2-4 servo. Line pressure is distributed through passage 306 and through the 1-2 shift valve to passage 308 when the 1-2 shift valve is in the upshift position. Communication between passage 308 and 306 is controlled by lands 294 and 292.

When the 1-2 shift valve is downshifted, passage 306 is brought into communication with exhaust port 310.

As will be explained subsequently, line 308 is an exhaust flow line when the transmission is downshifted to the first ratio so that flow restricting orifice D is bypassed. On the other hand, orifice D is introduced into the pressure feed passage for the apply side of this 2-4 servo when the transmission is shifted to the second, third or fourth ratio. This is consistent with the objective of eliminating flow restricting orifices in the exhaust flow passages, although flow controlling orifices are utilized to establish controlled engagement in the pressure feed lines for the clutches and the servo.

Passage 312 communicates with the right side of the 1-2 shift valve 242. It is subjected to line pressure when the transmission is conditioned for operation in the third and fourth ratio, which causes the shift valve spool 286 to shift in the left-hand direction following a 2-3 upshift.

The shift valve spool also provides a flow path between reverse line pressure passage 314 and passage 316, the latter extending to the manual valve. When the valve spool 286 is shifted to the left, passage 316 is connected to passage 314, which causes the reverse clutch 182 to become applied. When the valve spool 286 is shifted to the right in response to the development of a signal in passage 300, the passage 314 is brought into communication with exhaust port 318, thereby exhausting the reverse clutch 182.

The 2-3 shift valve is moved in a right-hand direction as viewed in FIG. 3 when the signal passage 320 is pressurized. Passage 320 communicates with the solenoid feed passage 322 through the pull-in valve 208 when the pull-in valve is moved in a left-hand direction as indicated in FIG. 3. The pull-in valve includes a valve spool 324 with lands 326, 328 and 330. Passage 320 communicates with the feed passage 322 through the space provided by lands 326 and 328 when the valve spool 324 is in the position shown in FIG. 3. It assumes that position when passage 332 is pressurized. That occurs whenever the manual valve 194 is moved to the low range position.

Passage 334 is a signal passage that extends from the shift solenoid 202 when the transmission is conditioned for low range first gear operation, as indicated in FIG. 3. Passage 334 is not pressurized. It communicates with feed passage 336 through the space provided between lands 328 and 330, which extends through the right side of the 2-3 shift valve 246.

Shift valve 246 comprises a valve spool 338 situated in a 2-3 shift valve chamber. Spool 338 comprises lands 340, 342, 344, 346 and 348. It is urged in a left-hand direction by valve spring 350. Valve spool 338 is urged against the force of the valve spring when pressure is present in the signal passage 320 during first and second ratio operation.

The 3-4 shift valve 248 has a valve spool 352, which is urged in a left-hand direction by pressure acting on the right-hand end of the valve spool. Pressure is delivered to the 3-4 shift valve through line pressure passage 354, which is pressurized when the 1-2 shift valve is shifted in a right-hand direction. Passage 354 is connected to the line pressure feed passage 308 through the 1-2 shift valve when the 1-2 shift valve is moved to the low ratio position. A valve spring 356 acts on the valve spool 352 to urge it in a left-hand direction.

Valve spool 352 includes spaced valve lands 358, 360, 362, 364 and 366.

The servo apply pressure passage 368 for the apply side of the 2-4 servo communicates with the modulated line pressure passage 370 through the space provided by lands 358 and 360 when the valve spool 352 is positioned as shown. If the 2-3 shift valve is upshifted, passage 370 communicates with modulated line pressure passage 372 through the 2-3 shift valve. Passage 368 communicates with passage 302 through the space provided by lands 358 and 360 when the spool 352 is shifted in a right-hand direction by the pressure in signal passage 300. That occurs, however, only if the pressure in passage 354 during operation of the first ratio is exhausted.

The servo apply feed passage 368 communicates with passage 302 when the valve spool 352 is shifted in a right-hand direction. That causes the apply side of the 2-4 servo to become pressurized on a 3-4 upshift.

The release side of the 2-4 servo communicates through line 371 with direct clutch pressure passage 372 when the valve spool 352 is shifted to the position shown in FIG. 3.

When the valve spool 352 is shifted in a right-hand direction, the servo release passage 371 is exhausted through exhaust port 374.

Line pressure passage 268, which is pressurized during operation in the direct drive second ratio and first ratio operation, communicates with passage 376 when the shift valve spool 352 is moved in a right-hand direction. This occurs during fourth ratio operation. The presence of pressure in passage 376 will trigger the operation of the servo release valve 220 as will be explained subsequently, thereby allowing a direct connection between the direct clutch supply pressure passage and the exhaust port in the servo release valve. This again is consistent with the concept of providing unrestricted flow from the applied clutches and brake servo when the clutches and brake servo are released, although control orifices are introduced in the feed lines for the clutches and servo.

Passage 378, which is connected to the line pressure passage 268 through the 3-4 shift valve when the 3-4 shift valve is in a left-hand direction, is exhausted through exhaust port 381 when the 3-4 shift valve is shifted in a right-hand direction. Passage 378 extends through the coast clutch control valve 224. The coast clutch feed passage is shown at 380.

The coast clutch valve comprises a valve spool 382 having spaced lands 384 and 386. The right-hand side of the land 386 is subjected to a signal pressure in signal pressure passage 388. The 3-2 timing coast clutch solenoid valve 196 supplies a signal pressure to passage 388 under the control of the microprocessor when the value of the signal in passage 388 is zero, the valve spring 390 urges the valve spool 382 in a right-hand direction, thereby establishing communication between passages 380 and 378. If a signal is present in passage 388, passage 380 becomes connected to coast clutch valve exhaust port 392. Thus, engagement and release of the coast clutch valve is under the control of the microprocessor.

The final drive lubrication circuit, shown generally in FIG. 3 at 394, is supplied by the solenoid feed pressure passage 272. Orifice U is located in the feed passage 272, as indicated in FIG. 3, as well as in FIG. 35A.

Figure 4:
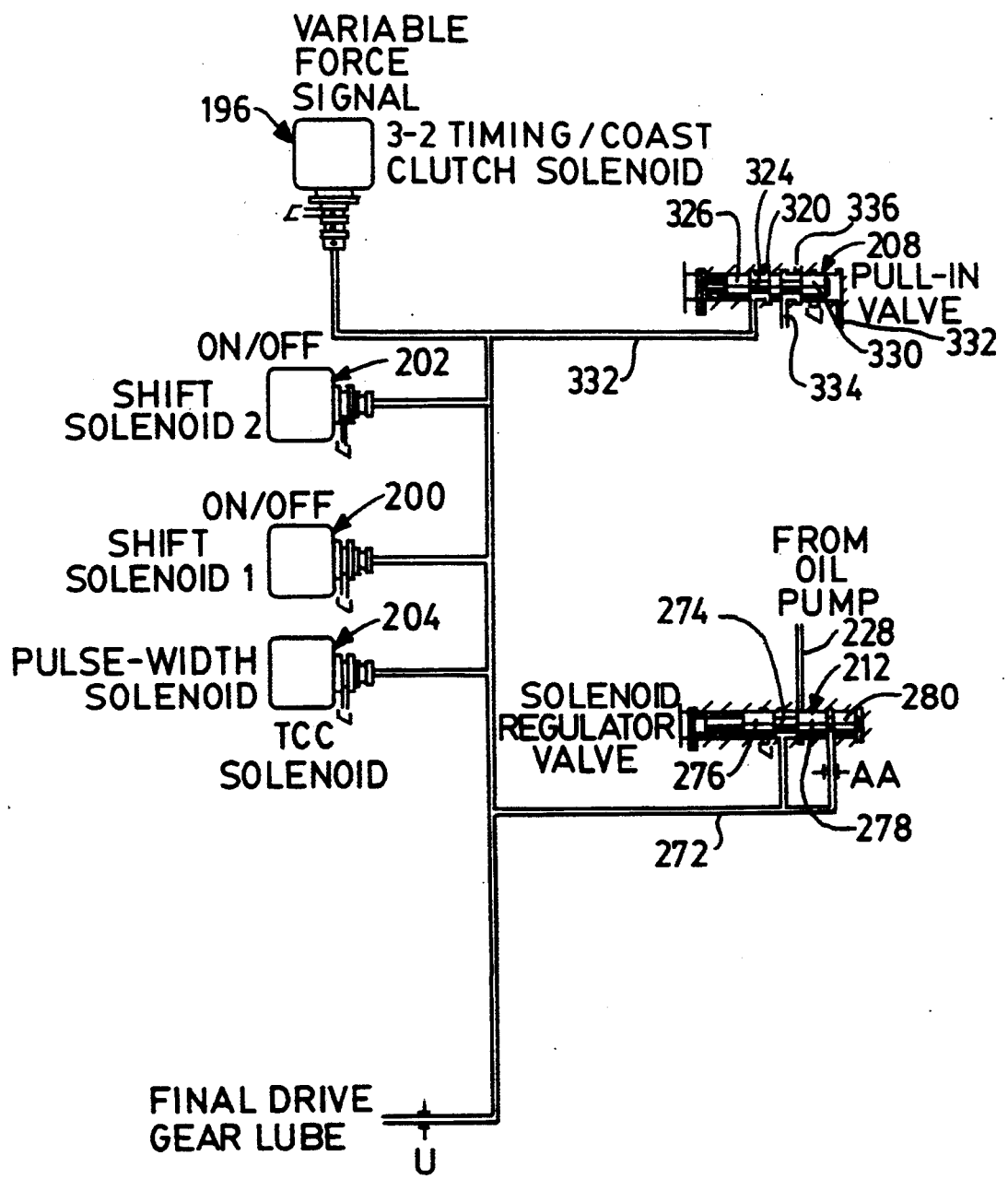
FIG. 4 is a partial valve diagram showing the solenoid feed and final drive gear lubrication circuit for manual low first gear operation.

FIG. 4 shows a solenoid feed circuit in the final drive gear lubrication circuit in isolation of the other valve elements. A solenoid feed pressure, as explained previously, is developed by the solenoid regulator valve 212, which modulates the line pressure in passage 228 to produce a desired feed pressure in passage 272.

The flow of fluid in the servo feed circuit to the pull-in valve 208 allows for operation in low range second gear operation. This may occur as the manual valve is moved to the "L" position, which causes the pull-in valve to shift in the left-hand direction, thereby conditioning the 2-3 shift valve and the 1-2 shift valve for operation in the first or second gear ratio position, even though the shift solenoids may not function.

Figure 5:
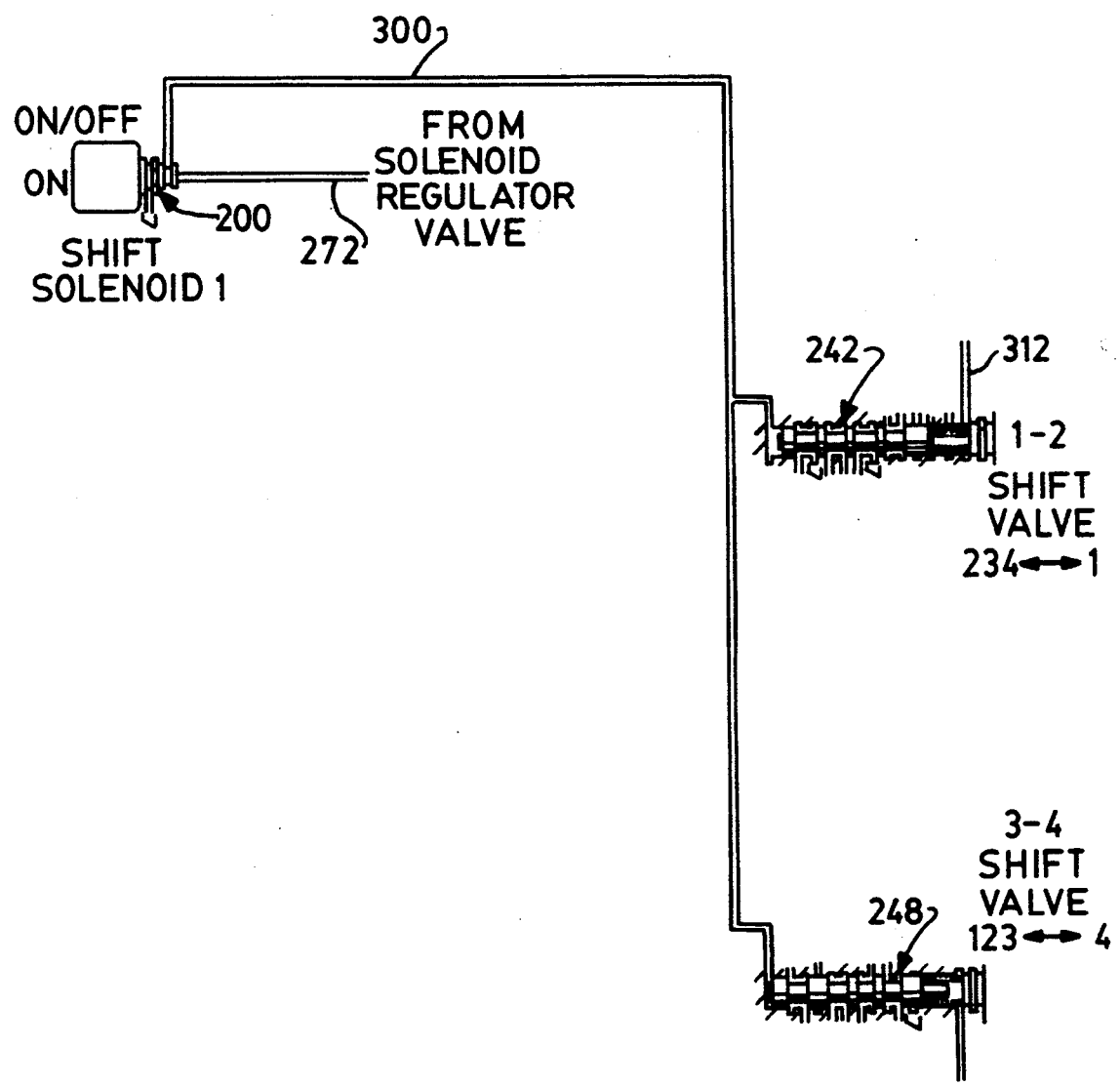
FIG. 5 s a partial valve diagram showing the shift solenoid that distributes signal pressure to the 1-2 shift valve and the 3-4 shift valve.

FIG. 5 shows a hydraulic circuit for the shift solenoid 200. It is shown in isolation of the other valve elements for purposes of clarity. Fluid in the servo feed circuit 272 is allowed to flow through the shift solenoid valve 200 causing a force on the 1-2 shift valve that shifts the 1-2 shift valve to the right. Although the 3-4 shift valve is loaded with the same pressure that exists in passage 300, movement of the 3-4 shift valve is prevented by line pressure acting on the right-hand side of the 3-4 shift valve as explained previously with reference to FIG. 3.

The shift solenoid valve 200 is on during operation in the "D" range, the "2" range and the low range first gear, as well as in the "D" range fourth gear. If the shift solenoid 200 is in the fourth gear, fluid under pressure in passage 300 moves the 3-4 shift valve but not the 1-2 shift valve. The reason for this is because pressure in passage 312, which communicates with the right-hand side of the 1-2 shift valve, prevents movement of the 1-2 shift valve to the right.

Figure 6:
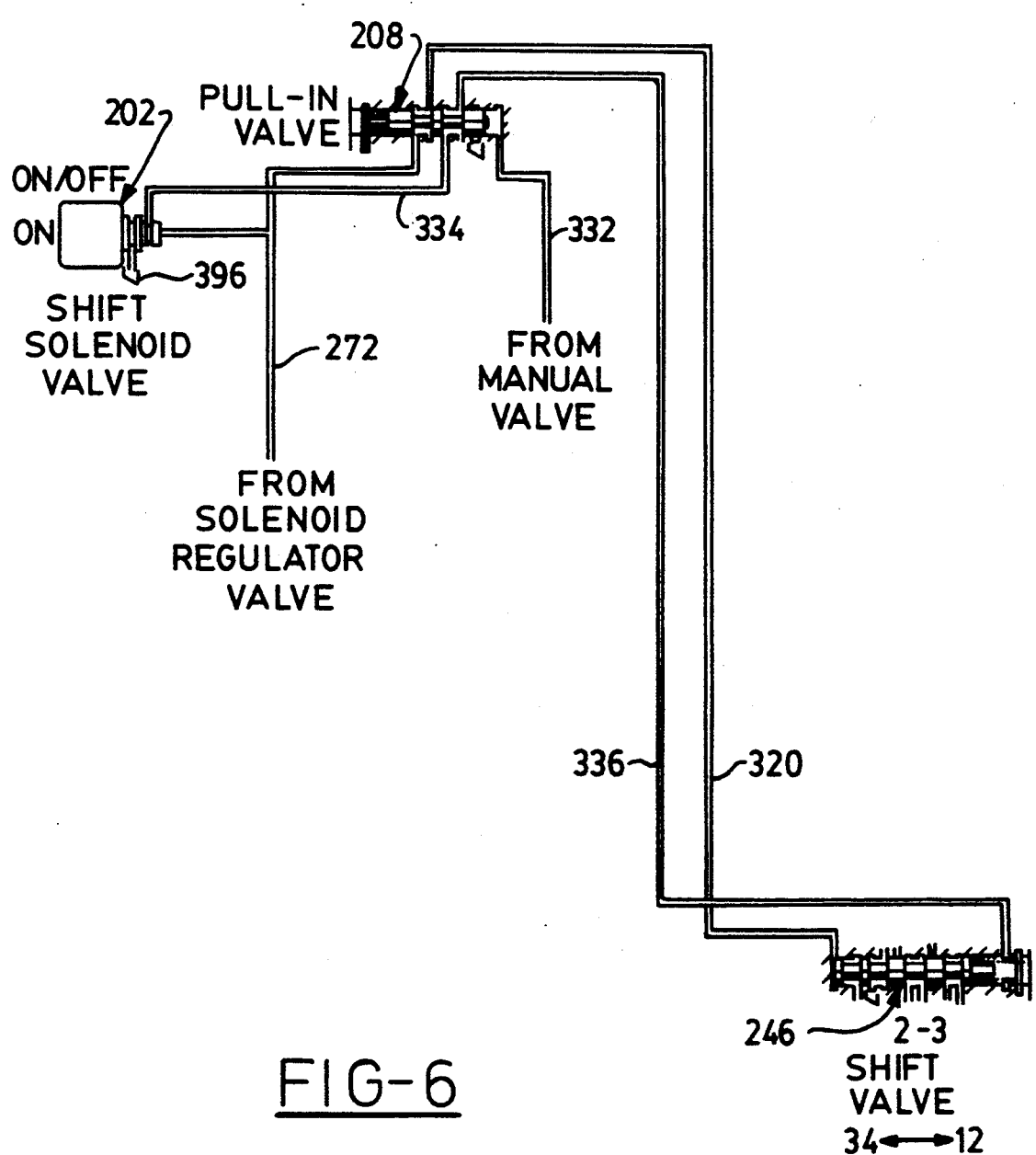
FIG. 6 is a partial valve diagram showing the shift solenoid circuit for low range third gear operation.

As seen in FIG. 6, when the shift solenoid 202 is on during operation in the low range, fluid under pressure in signal passage 334 is transferred through the pull-in valve 208 to the passage 336. This creates a pressure on the 2-3 shift valve that prevents the 2-3 shift valve from moving in a right-hand direction. If the shift solenoid 202 is off in the low range, passage 334 is connected to exhaust port 396 in the solenoid valve 202. The solenoid feed circuit then becomes connected to passage 320, which allows the 2-3 shift valve to be shifted in a right-hand direction, thus allowing first or second gear operation.

Figure 7:
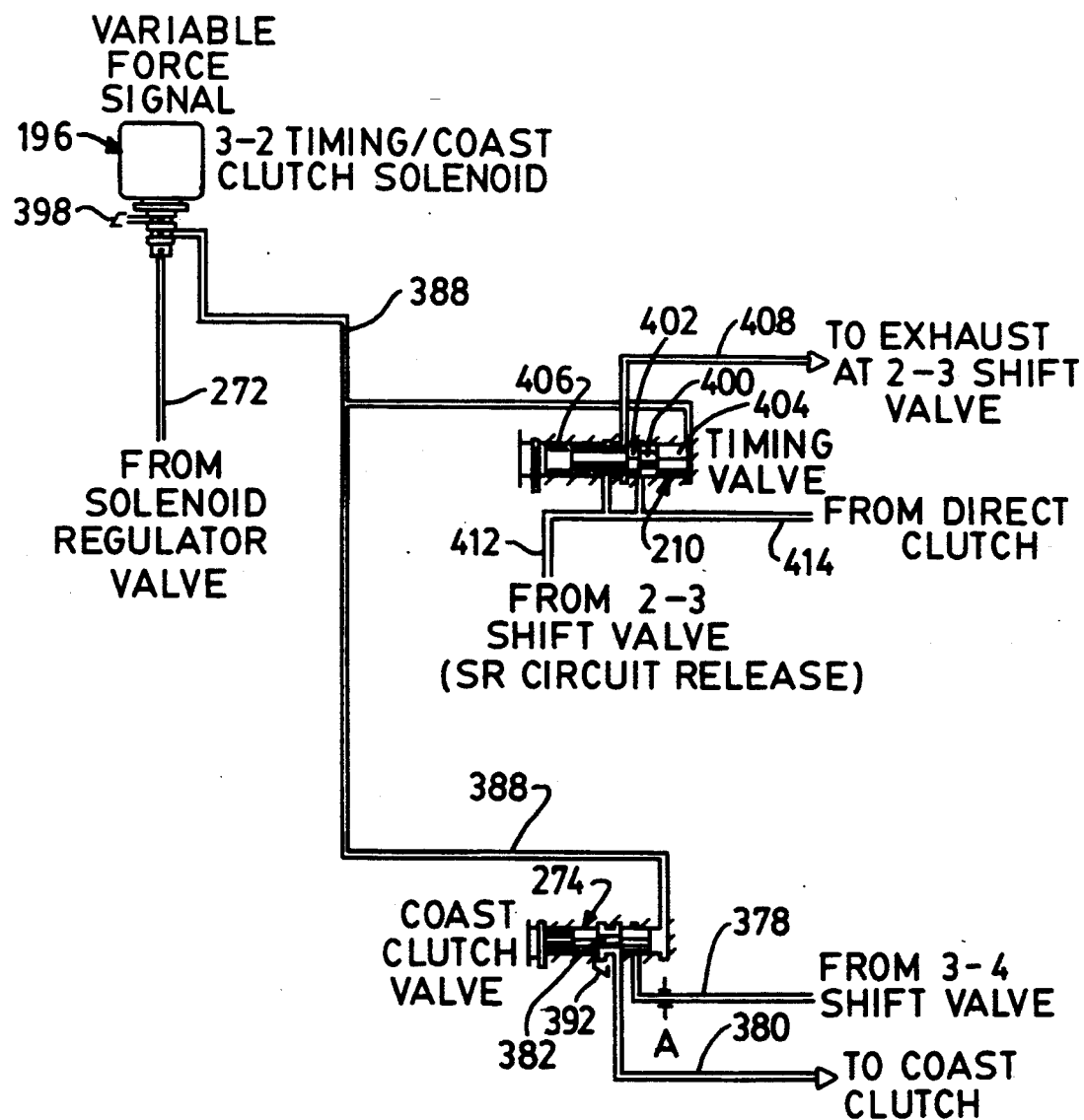
FIG. 7 is a partial valve diagram showing the 3-2 timing and coast clutch solenoid circuit during a 3-2 shift at low speeds.

FIG. 7 shows the 3-2 timing valve and coast clutch solenoid hydraulic circuit in isolation of the other valve elements. As explained previously, the processor controls the current supplied to the 3-2 timing closed clutch solenoid valve 196. The valve 196 establishes a moderate signal pressure in passage 388. If the current supplied to the variable force solenoid is zero, the pressure in passage 388 will be exhausted through exhaust port 398 in the solenoid valve 196. This allows coast clutch valve 224 to shift in a right-hand direction, thereby connecting the line pressure passage 378 to the coast clutch supply pressure passage 380 through the coast clutch valve. Communication between passage 380 and exhaust port 392 in the coast clutch valve is interrupted. This applies to the coast clutch.

Control pressure in passage 388 will control the operation of the 3-2 timing valve 210. This valve comprises a valve spool 400 which has spaced lands 402 and 404. A valve spring 406 urges the valve spool 400 in a right-hand direction. Passage 408 communicates with the timing valve 210 adjacent the land 402. If the 2-3 shift valve is shifted to the first and second ratio position, passage 308 communicates with exhaust port 410 in the 2-3 shift valve, as shown in FIGS. 3 and 5B. Passage 412, shown in FIG. 7, is a direct clutch pressure passage which communicates directly with direct clutch 88 and with the release side of the 2-4 servo 222.

Passage 370, previously described, extends through the 3-4 shift valve when the 3-4 shift valve is in a left-hand position, through passage 373 and through the servo release valve 228 to the direct clutch passage 414. There are no flow restricting orifices in that exhaust flow path. The timing of the 3-2 shift then is controlled by the calibration of the 3-2 timing valve 210. The 3-2 timing valve provides a slow exhaust of the direct clutch circuit during a 3-2 shift as pressure is released from the direct clutch as well as from the release side of the 2-4 servo through the 2-3 shift valve. The same pressure that exists in passage 388 for effecting the timing of the release of pressure from the direct clutch on the release side of the 2-4 servo is applied to the right side of the coast clutch 224, which strokes the coast clutch valve spool 382 in a left-hand direction. This interrupts communication between passage 378 and passage 380. Further, passage 380 becomes connected to exhaust port 392 and the coast clutch valve 224. Thus, the coast clutch valve will not allow fluid pressure in passage 378 to enter the coast clutch circuit and the coast clutch is released.

Figure 8:
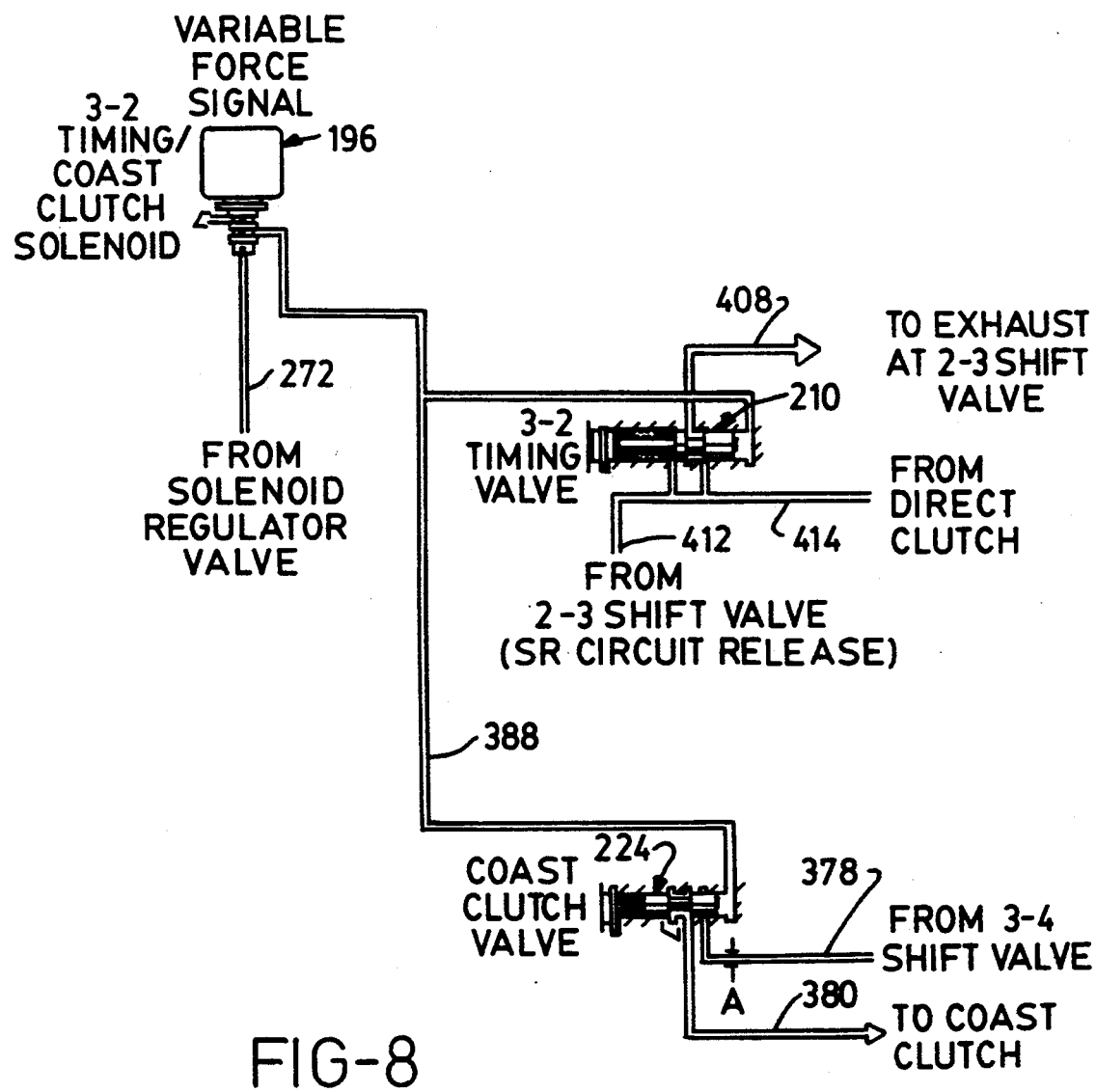
FIG. 8 is a partial valve diagram showing the 3-2 timing and coast clutch solenoid circuit during a 3-2 shift at high vehicle speeds.

FIG. 8 shows the condition of the 3-2 timing and coast clutch solenoid circuit when the pressure in passage 388 is higher as the result of an increased current supplied to the solenoid valve 196. Under these conditions, the flow restriction provided by the 3-2 timing valve 210 is reduced, and a fast exhaust is established from the direct clutch and servo release circuits during a 3-2 shift. Again, the coast clutch 224, as seen in FIG. 8, prevents the coast clutch from becoming applied as communication between passage 378 and 380 is interrupted.

Figure 9A:
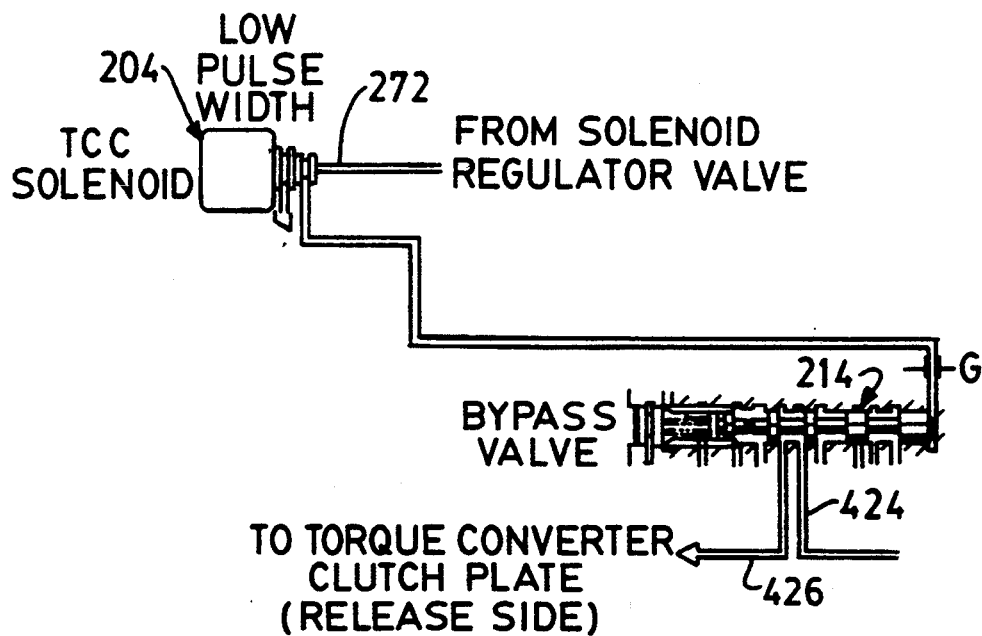
FIGS. 9A and 9 show partial valve diagrams of the torque converter clutch circuit with the clutch released and applied, respectively.
Figure 10:
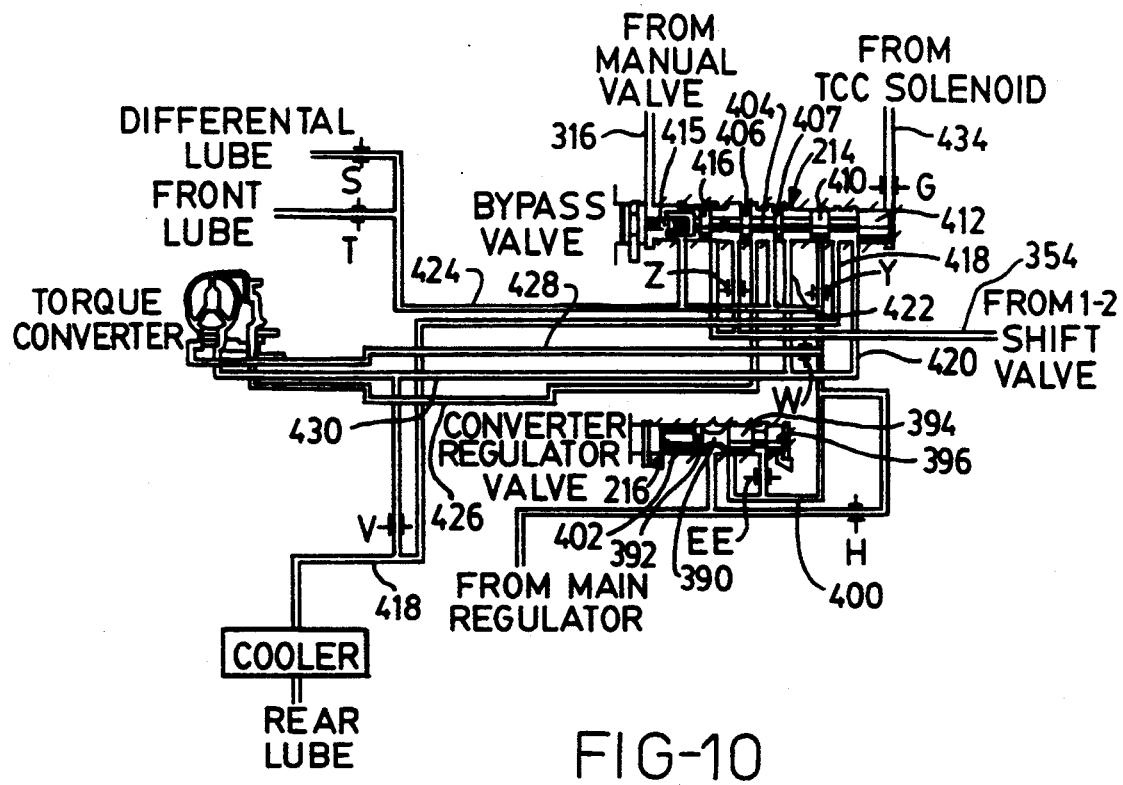
FIG. 10 is a partial valve diagram showing the torque converter lubrication circuit with the torque converter clutch released.

In FIGS. 10 and 9A, torque converter bypass valve 214 is shown in its operative position when the torque converter clutch is released. The torque converter bypass clutch 214 is supplied with regulated pressure from the converter regulator valve 216, which comprises a valve spool 390 with spaced lands 392, 394 and 396. Fluid pressure from the regulated line pressure passage 398 communicates with the valve 216 at a point intermediate the lands 392 and 394, and regulated pressure in passage 400 is distributed to the converter bypass valve 214. Lands 394 and 396 have a differential area that is exposed to the pressure in passage 400 across orifice E. Force produced by that differential pressure is opposed by valve spring 402.

Bypass valve 214 comprises a valve spool 404, which has spaced lands 406, 407, 410 and 412. Converter regulator output pressure in passage 400 communicates with valve 214 adjacent land 410 as the valve spool 404 is shifted in a left-hand direction against the opposing force of valve spring 415 acting on plunger 416. Communication between passage 400 and torque converter return passage 418 is controlled. Simultaneously, communication between passage 418 and torque converter turbine feed passage 420 is controlled by land 412.

Torque converter impeller feed passage 422 communicates with regulated converter pressure in passage 400. Communication between converter impeller feed passage 422 and the lubricant return passage 424 is controlled by land 407. Similarly, land 408 controls the degree of communication between passage 424 and the converter clutch feed passage 426.

When the torque converter clutch is released, the regulated pressure in passage 424 passes to converter bypass clutch feed passage 426, as indicated in FIG. 10. Converter impeller feed passage 428 communicates the regulated converter pressure passage 400 through orifice W. Since passage 424 is pressurized, fluid flows across the friction plates of the torque converter bypass clutch, into the torque converter turbine circuit 430 and then to the torque converter circuit 418, which extends from the rear lubrication circuit as indicated in FIG. 10.

The position of the valve spool 404 determines the fluid pressure in the passage 424, which enters the bypass clutch feed passage 426. Signal passage 434 extends to the bypass clutch solenoid valve 204. It delivers a signal pressure to the bypass clutch valve 214. As the signal developed by the bypass clutch solenoid valve 204, which is a pulse width modulated signal, changes, the pressure in the torque converter bypass clutch 426 will be changed accordingly.

During reverse drive operation, reverse line pressure passage 316 is pressurized. This causes the bypass clutch valve spool 404 to be shifted in a right-hand direction as reverse line pressure acts on the left side of the plunger 414. This results in a high bypass clutch pressure in passage 426, which in turn results in the release of the bypass clutch.

During operation of the transmission in the "D" second manual range and the first manual range, when the transmission is conditioned for first-gear operation, fluid under pressure in passage 354 is delivered to the bypass valve 214 and acts on the left side of the land 406 to urge the spool 404 in a right-hand direction, thereby preventing the application of the torque converter clutch.

Figure 9B:
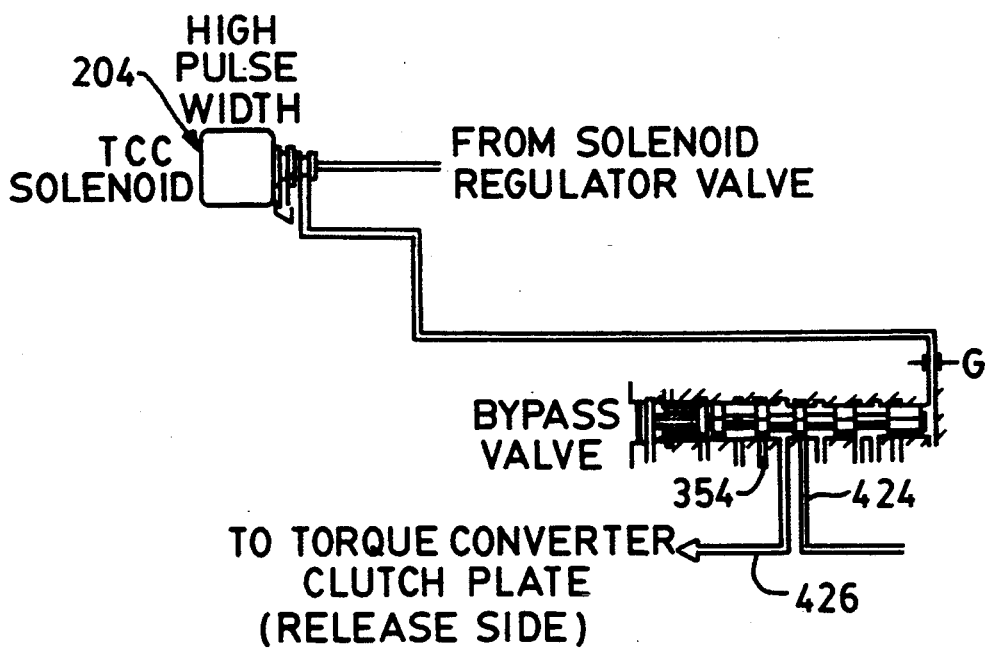

FIG. 9A shows the position of the bypass valve when the torque converter clutch is released. This corresponds to the position shown in FIG. 10. As seen in FIG. 9A, passage 424 is brought into communication with passage 426. On the other hand, when the torque converter clutch is applied as the bypass valve assumes the position shown in FIG. 9B, communication between passages 424 and 426 is restricted and passage 426 is brought into partial communication with passage 354, which is exhausted. Whenever the manual valve is in the drive range position D and 1-2 shift valve 242 is in the upshift position, it is exhausted through port 304 in the 1-2 shift valve 242.

Shift signal pressure in passage 434 is low at low pulse width of the solenoid valve 204, which results in release of the clutch. At high pulse width, the pressure in passage 434 will be higher, resulting in application of the converter clutch. At moderate and varying current available to the bypass clutch solenoid 204, the signal pressure in passage 434 will be variable, which results in a controlled slip of the torque converter clutch. If a signal is lacking in passage 434, the clutch will be released as the valve spool 404 is shifted in a right-hand direction, which ensures that the torque converter clutch will be released.

Figure 11:
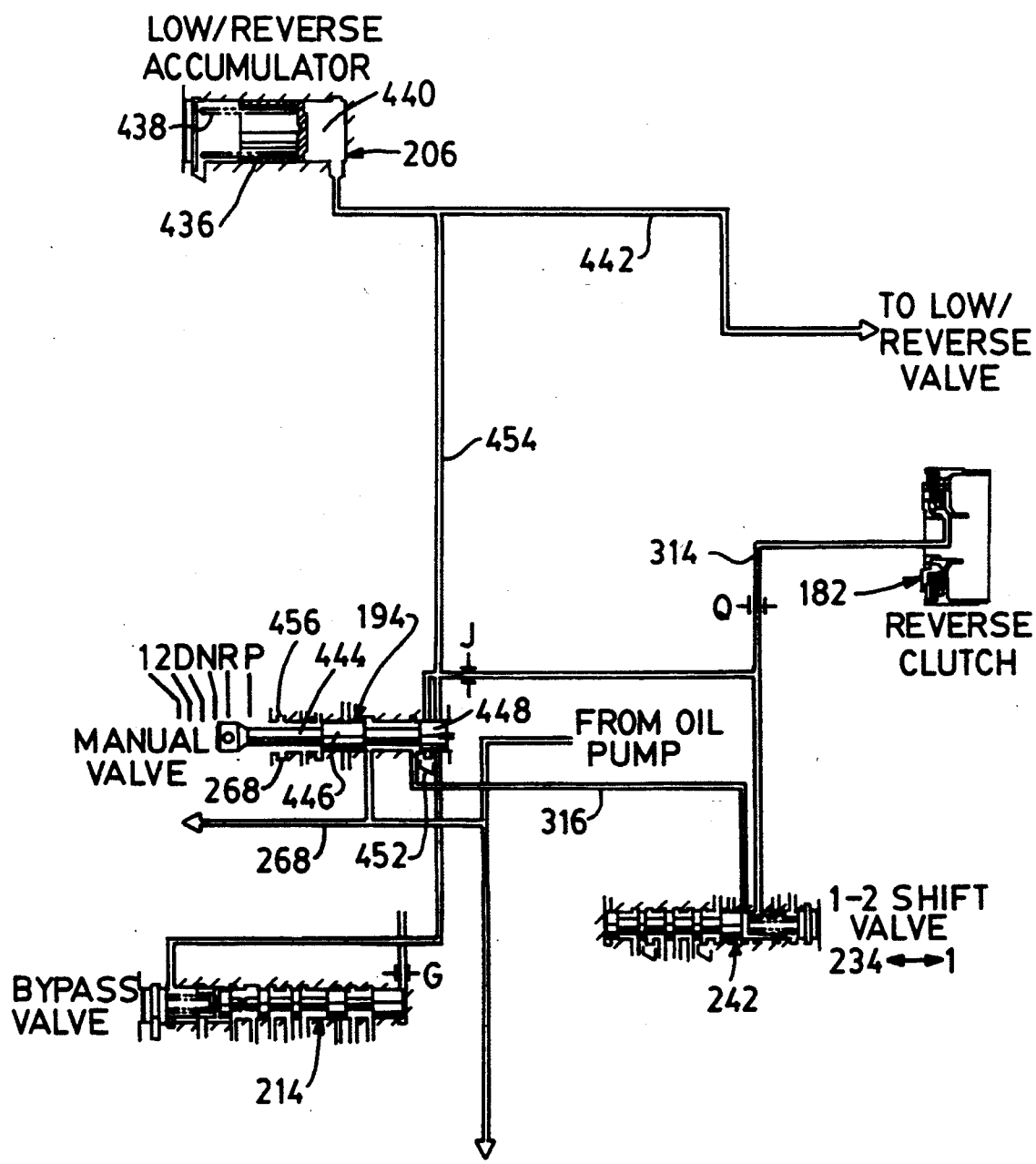
FIG. 11 is a partial valve diagram showing the reverse clutch circuit.

Referring next to FIG. 11, we have shown the reverse clutch circuit during operation in the reverse range. The circuit includes the previously discussed low reverse accumulator 206, which comprises an accumulator piston 436 situated in an accumulator cylinder. Piston 436 is biased by spring 438 against the opposing force of pressure in accumulator pressure chamber 440. Chamber 440 communicates with the low reverse valve 240 through low reverse clutch feed passage 442. The low reverse valve will be described with reference to FIG. 12.

The manual valve comprises a manual valve spool 444 with spaced lands 446 and 448. Regulated line pressure passage 268, which extends from the line pressure modulator valve 218, will be described with reference to FIGS. 13–18. When the manual valve spool 444 is shifted to the reverse drive position shown in FIG. 11, the lands 446 and 448 establish communication between passage 268 and reverse pressure passage 316, which extends to the 1-2 shift valve. The 1-2 shift valve 242 establishes communication between passage 316 and reverse clutch feed passage 314, as indicated in FIG. 11.

Passage 450 communicates also with passage 316 described previously with reference to FIG. 10, thereby shifting the bypass valve to the right and preventing the bypass valve from applying the torque converter clutch.

When the manual valve spool 444 is shifted to any position other than reverse drive position, the manual valve will provide an exhaust flow path for the reverse circuit. An exhaust port is shown at 452 directly adjacent land 448.

Passage 314, which feeds the reverse clutch 182, acts as a feed passage for the low and reverse clutch accumulator feed passage 454. Communication between passage 314 and passage 454 occurs through flow restriction orifice J, as seen in FIG. 11.

The manual valve has a split port design so that when the land 448 is positioned as shown in FIG. 11, pressurized passage 316 in reverse drive will not feed pressure across the land 448 directly to passage 454. Instead, the passage 454 must be pressurized with fluid that passes through the orifice J. Thus, the reverse clutch 182 will be applied by the pressure in passage 314 before the low and reverse clutch 152 is applied by the pressure in passage 442.

Figure 19:
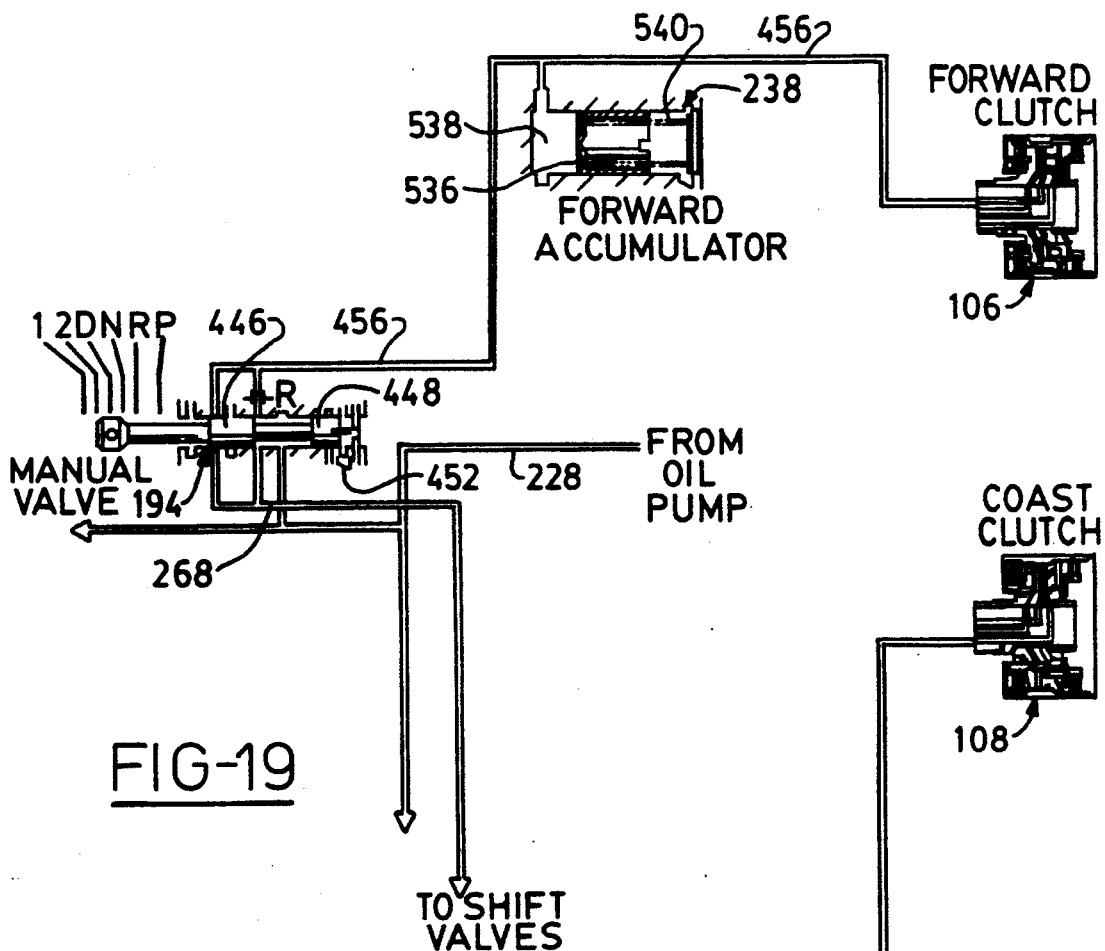
FIG. 19 is a partial valve diagram showing the forward clutch circuits when the manual valve is in the drive range, the second manual range position or the first manual range position.

The manual valve also has a split port that connects line pressure passage 268 to the forward clutch feed passage 456. As will be described with reference to FIG. 19, the forward clutch feed passage 456 may be exhausted through the manual valve when the manual valve is moved to the reverse position without passing through a flow control orifice. Line pressure in passage 268, however, is not distributed across the split port arrangement of the manual valve to the passage 456. Rather, the pressure is distributed from passage 268 through flow restricting orifice R, which is shown in FIG. 19 but not in FIG. 11. This again is consistent with the concept of providing a flow control orifice during engagement of the various friction elements while providing a direct connection with exhaust from the friction elements when the friction element is disengaged.

Figure 12:
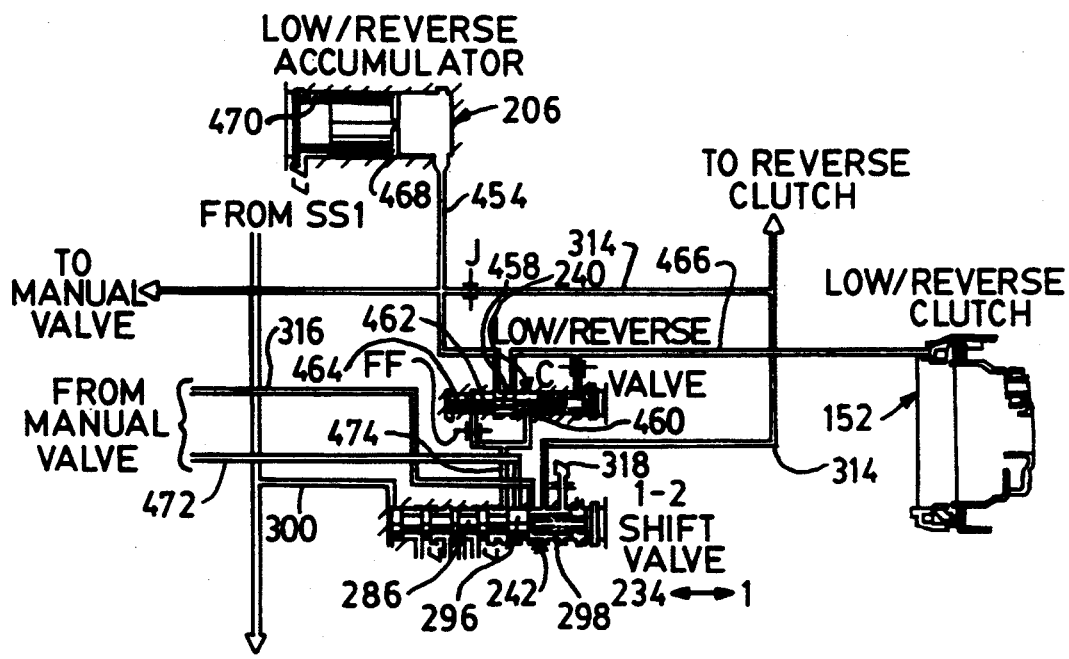
FIG. 12 is a partial valve diagram showing the low and reverse clutch circuits when the transmission is conditioned for reverse operation.

As seen in FIG. 12, the low reverse valve 240 includes a valve spool 458, which is formed with three spaced lands, the first two lands 460 and 462 having a common diameter. Land 464 has a diameter less than the diameter of land 462. When the spool 458 is positioned as shown, the low reverse clutch feed passage 466 communicates directly with the passage 454 through the space provided by lands 462 and 460.

When the manual valve is shifted to the reverse position, as explained previously, passage 314 becomes pressurized. This causes a pressure build-up in passage 454, which is controlled by the orifice J as the pressure build-up continues. The pressure in passage 466 will stroke the spool 458 in a left-hand direction, as viewed in FIG. 12. The pressure build-up causes the low reverse accumulator piston 468 to stroke against the spring force of accumulator spring 470. After a pressure build-up in passage 466, and after that pressure strokes the low reverse clutch piston, continued pressure build-up is controlled by the accumulator 206.

If the microprocessor detects that a shift into reverse range is occurring above a specified vehicle speed, a signal will be distributed to shift signal passage 300 by the shift solenoid 200. The 1-2 shift valve then will be stroked in a right-hand direction. This will block pressure distribution from the reverse line pressure passage 316 as land 296 on the 1-2 shift valve moves in a right-hand direction. Simultaneously, land 298 on the 1-2 shift valve will provide communication between reverse clutch feed passage 314 and the previously described shift valve exhaust port 318.

Reverse clutch feed passage 316, as explained previously, is exhausted through the manual valve when the manual valve is moved to a position other than the reverse drive position.

When the manual valve is moved to the low range position, fluid is delivered from the manual valve to passage 472. Passage 472 extends to passage 332 which distributes pressure to the right-hand end of the pull-in valve 208, as described with reference to FIG. 3, which conditions the pull-in valve for possible second or third gear operation. Line pressure is distributed also through the 1-2 shift valve 242 into the passage 474, which extends to the differential area of lands 462 and 464 of the low reverse valve 240. As pressure builds up in passage 474, land 460 and low-and-reverse valve 240 provide controlled communication between passage 474 and low and reverse feed passage 466. The valve 240 thus modulates the pressure in the low and reverse clutch 152 during first-gear operation in low range.

If the microprocessor detects that a shift into low range is occurring above a specified vehicle speed, it will respond by turning off the pressure signal in passage 300. When this occurs, passage 472 will be blocked by land 296.

When the manual valve is moved to the low range position, it provides an exhaust flow path for feed passage 472.

Figure 13:
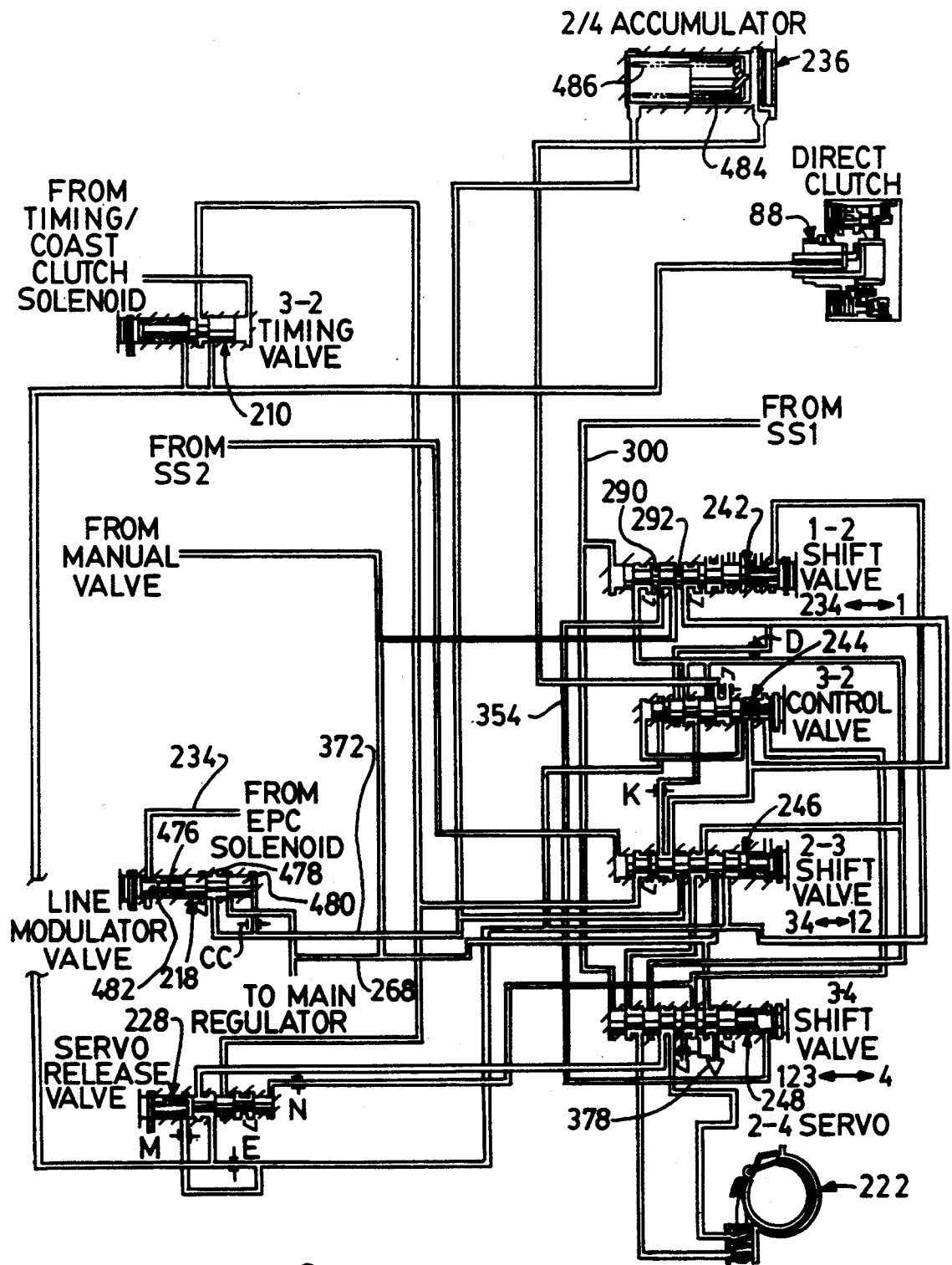
FIG. 13 is a partial valve diagram showing the 2-4 servo and direct clutch circuits during operation in the drive range or in the second manual range when the gearing is in the first gear ratio.

FIGS. 13–18 show the circuits for the 2-4 servo and the direct clutch. They illustrate the positions of the various valve elements that affect the 2-4 servo and direct clutch during ratio changes. Referring first to FIG. 13, the line pressure modulator valve 218 is shown in its pressure modulating position. It includes a modulator valve spool 476 with spaced lands 478 and 480. It is biased in a right-hand direction by valve spring 482. Throttle valve pressure in passage 234, which is developed by the variable force solenoid valve 198, acts on the valve land 478, thus providing a force that assists with the valve spring. Line pressure in passage 268, which is pressurized whenever the manual valve is in the "D" position, the "2" position or the low position, is modulated by the valve 218. The output pressure of valve 281 is a modulated line pressure in passage 372, which, as explained earlier, is distributed to the 2-3 shift valve 246. Modulated line pressure in passage 372 is distributed also to the 2-4 accumulator 236 which comprises an accumulator valve piston 484 located in an accumulator cylinder. Accumulator spring 486 urges a piston 484 in a right-hand direction. Modulated line pressure in passage 372 acts on the piston 484 to assist the spring 486.

When the manual valve is in the "D" position, the "2" position and the low position, the 2-4 band is applied during second and fourth gear operation. The direct clutch is applied in third and fourth gear operation.

As seen in FIG. 13, the 1-2 shift valve is shifted to the right during first gear operation as signal pressure from the shift solenoid 200 is distributed through passage 300 to the left side of the 1-2 shift valve spool. Line pressure in passage 268 passes through the 1-2 shift valve between lands 290 and 292. Thus, line pressure is distributed through passage 354 to the right side of 3-4 shift valve 248. This locks the 3-4 shift valve in a left-hand direction, permitting line pressure to pass from passage 268 to passage 378, which leads to the coast clutch valve 224.

Shift signal pressure from the shift solenoid 202 extends to the 2-3 shift valve though passage 320 and holds the 2-3 shift valve spool in a right-hand direction, as indicated in FIG. 13. This blocks line pressure passage 268 as well as modulated line pressure passage 372.

Both the 1-2 shift valve and the 2-3 shift valve are stroked in a right-hand direction against the opposing force of their respective valve springs. The 3-4 shift valve does not move because line pressure is present in passage 354, which acts on the right-hand end of the 3-4 shift valve 248.

Figure 14:
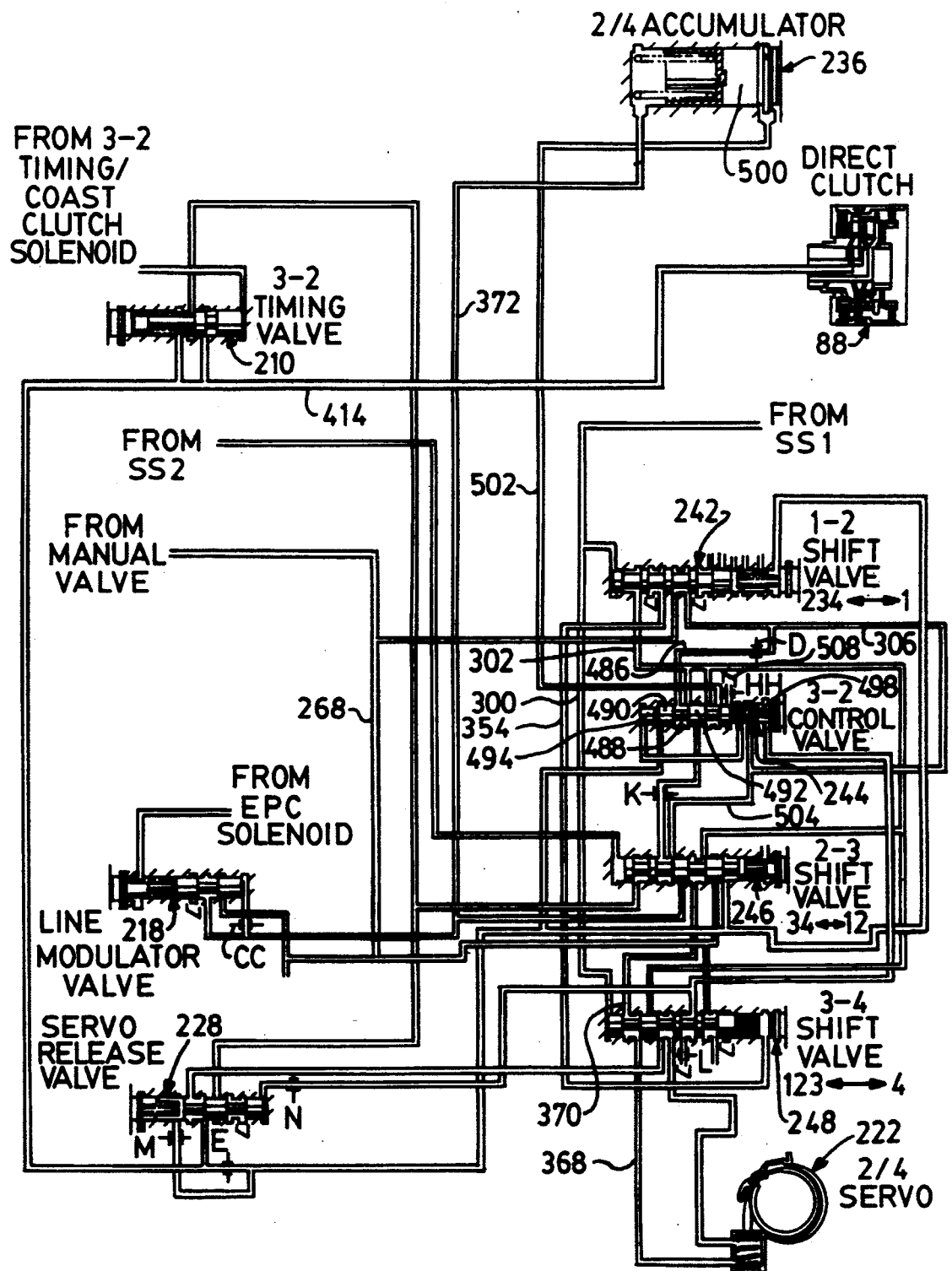
FIG. 14 is a partial valve diagram showing the 2-4 servo and direct clutch circuits when the manual valve is in the drive range or the second manual range after 1-2 shift.

FIG. 14 shows the condition of the 2-4 servo circuit and direct clutch circuit during second gear operation. In the condition shown in FIG. 14, the shift solenoid 200 is turned off while shift solenoid 202 remains on. This causes the 1-2 shift valve to move in a left-hand direction under the force of the 1-2 shift valve spring since the pressure in passage 300 is zero. Pressurized fluid in the line pressure passage 268 then passes through the 1-2 shift valve to passage 306. Passage 306 communicates with passage 486 through orifice "D" as shown in FIG. 14. Passage 46 communicates with the 3-2 control valve 244. This valve comprises a valve spool 488 having lands 490, 492, 494 and 496. It is biased in a left-hand direction, as viewed in FIG. 14, by a valve spring 498. When the valve 244 is positioned as shown in FIG. 14, lands 490 and 492 establish communication between passage 486 and passage 302. Passage 302 extends through the 2-3 shift valve to passage 370, which communicates with the servo apply passage 368 extending to the 2-4 servo 222.

The accumulator pressure chamber 500 for the 2-4 accumulator 236 communicates with accumulator pressure passage 502. As seen in FIG. 14, the line pressure that is made available to the 1-2 shift valve, the 3-2 control valve, the 2-3 shift valve and the 3-4 shift valve acts on the right side of the accumulator 236. The spring side of the accumulator 236 is pressurized by modulated line pressure. This action assists in matching the 1-2 shift feel with vehicle operating conditions.

Line pressure in passage 306 is distributed to the 3-2 control valve. The 3-2 control valve blocks communication between passage 306 and passage 504. This prepares the 3-2 control valve for a future 3-2 downshift.

Figure 15:
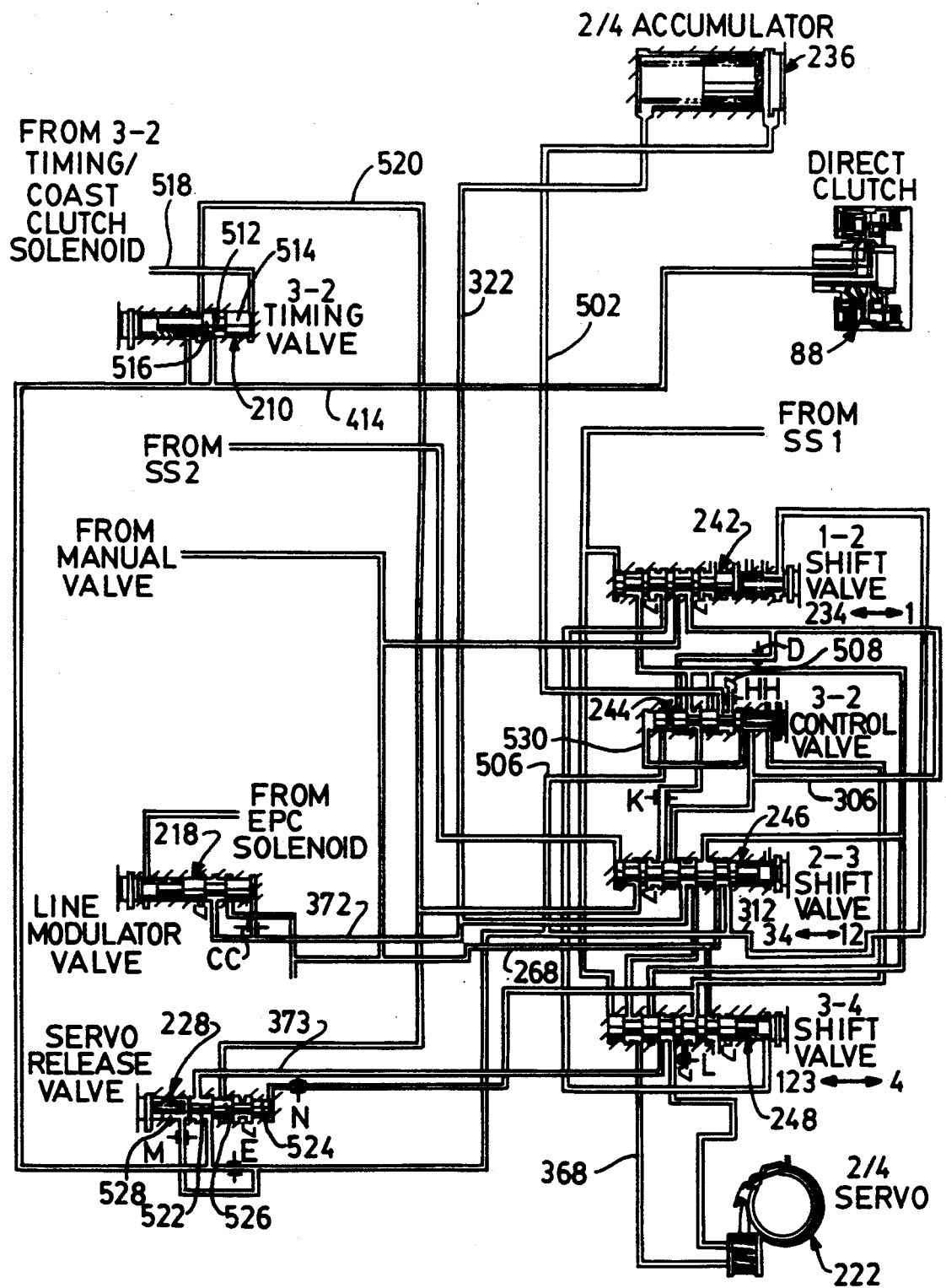
FIG. 15 is a partial valve diagram showing the 2-4 servo and direct clutch circuits with the manual valve in the drive range position or in the second manual range position, third gear operation, after a 2-3 shift.

FIG. 15 shows the positions of the valves of FIGS. 13 and 14 when they are conditioned for third gear operation. As seen in FIG. 15, the microprocessor controls a 3-2 shift by turning off shift solenoid 202 while shift solenoid 200 remains off. The pressure signals that are distributed to the 1-2 shift valve, the 2-3 shift valve and the 3-4 shift valve from the shift solenoids then are zero, and each of the shift valves is shifted in a left-hand direction. Line pressure in passage 268 then passes through the 2-3 shift valve to passage 312. Line pressure then is distributed to the right-hand side of the 1-2 shift valve, thus locking the 1-2 shift valve in a left-hand position. Pressure in passage 312 is distributed to passage 506, thus causing it to move in a right-hand direction. This exhausts the accumulator 236 through the passage 502. The exhaust port for the 3-2 control valve is shown at 508.

Pressurized passage 312 communicates also with direct clutch feed passage 414 through flow control orifice E shown in FIG. 35A and in FIG. 15.

Line pressure in the direct clutch feed passage extends to the 3-2 timing valve 210 as well as to the direct clutch. The 3-2 timing valve comprises a valve spool 512 with spaced lands 514 and 516. The right-hand side of the land 514 is acted upon by a signal pressure from the 3-2 timing coast clutch solenoid valve 196, the signal passage being shown at 518. The 3-2 timing valve spool 512 is shifted in a right-hand direction, which interrupts communication between passage 414 and passage 520 leading to the servo release valve 228.

Servo release valve 228 comprises a valve spool 522 having spaced valve lands 524, 526, 528. It is urged in the right-hand direction by a servo release valve spring. When the valve is positioned as shown in FIG. 15, direct clutch feed passage 414 is brought into communication with passage 372. That passage communicates with servo release pressure passage 370, through the space provided by lands 360 and 362 on the 3-4 shift valve. Thus, the 2-4 servo becomes released. At that time the apply side of the 2-4 servo is subjected to modulated line pressure in passage 368. Modulated line pressure is distributed to the passage 368 through the 3-4 shift valve and through the 2-3 shift valve. A modulated line pressure provides a cushion pressure at the 2-4 accumulator that is regulated by the throttle pressure in passage 234. This modulated line pressure regulated by throttle valve pressure assists in matching the 2-3 shift valve feel with vehicle operating conditions.

When the 3-2 control valve moves during the 2-3 shift, it provides an exhaust path for the accumulator circuit. This action prepares the 2-4 accumulator for the application of the 2-4 band and a shift to second or fourth gear, as indicated in FIG. 15. The 3-2 control valve is shifted in a right-hand direction thereby opening passage 502 to the exhaust port 508.

After the 3-2 control valve has been shifted, the 3-2 control valve spool establishes communication between passage 306 and a passage 530, which extends to the left-hand side of the 3-2 control valve 244 and locks the 3-2 control valve 244 in the right-hand position.

Figure 16:
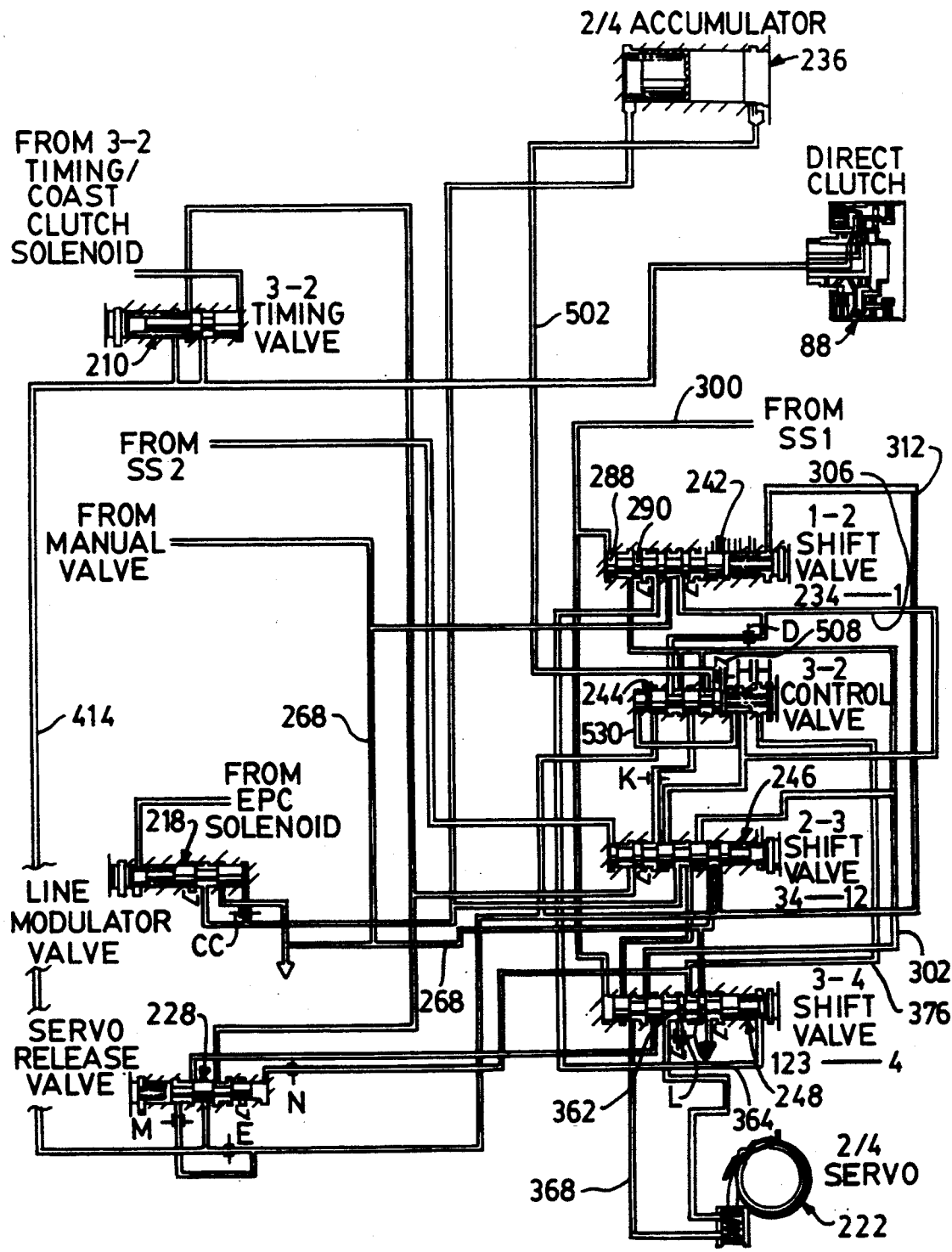
FIG. 16 a partial valve diagram showing the 2-4 servo and direct clutch circuits with the manual valve in the D or second manual range, fourth gear operation, after a 3-4 shift.

FIG. 16 shows the 2-4 servo and direct clutch circuit, specifically, the valve positions during operation in the D range or 2 range, fourth gear operation following a 3-4 shift. To achieve a 3-4 shift, the microprocessor turns on shift solenoid 200 while shift solenoid 202 remains off. A signal then is established in shift solenoid pressure passage 300 which extends to the left side of the 3-4 shift valve, causing the 3-4 shift valve to move to the right. The 1-2 shift valve also is subjected to the shift signal pressure in passage 300, but it does not shift to the right because line pressure is established in passage 312. As mentioned earlier, passage 312 communicates with the direct clutch and feed passage 414.

The line pressure passage 268 extending from the manual valve distributes pressure to the 3-4 shift valve. Since the 3-4 shift valve is moved to the right, the passage 268 is brought into communication with passage 376. The pressure in passage 376 acts on the right-hand end of the 3-2 control valve, causing it to shift in a left-hand direction in preparation for a downshift. It extends also to the right-hand side of the servo release valve 228 where it acts on land 524 to urge the valve spool 522 in a left-hand direction thus preparing the servo release valve for a downshift.

Since the 3-4 shift valve is shifted in a right-hand direction, lands 362 and 364 establish communication between passage 268 and passage 302. Passage 302 extends to the 3-2 control valve. With the 3-2 control valve stroked in a left-hand direction, it establishes communication between passage 302 and passage 486. The 1-2 shift valve, which is shifted in the left-hand direction, establishes communication between passage 268 and passage 306. This also pressurizes passage 486 since passage 306 communicates with passage 486 through the orifice at D. Fluid then passes through the 3-2 control valve 244 from passage 486 to passage 302. This causes line pressure to be distributed to the 1-2 shift valve between lands 288 and 290. Pressure in passage 302 passes through the 3-2 control valve to the accumulator passage 502 and to the apply side of the 2-4 accumulator. Line pressure passes also from passage 306 to the 2-3 shift valve and through the 3-4 shift valve 248. During application of the 2-4 servo, the modulated line pressure provides a cushion at the 2-4 accumulator which, as explained previously, is controlled by the throttle valve pressure in passage 234. This action assists in matching the 3-4 shift feel with vehicle operating conditions.

The movement of the servo release valve in a left-hand direction under the influence of line pressure in passage 376 provides a continuous application of the direct clutch while the servo release side of the 2-4 servo is exhausted. The movement of the 3-4 shift valve provides an exhaust flow path for the release side of the 2-4 servo.

Movement of the 3-2 control valve causes the passage 530 at the 3-2 control valve to be exhausted through exhaust port 508.

Figure 17:
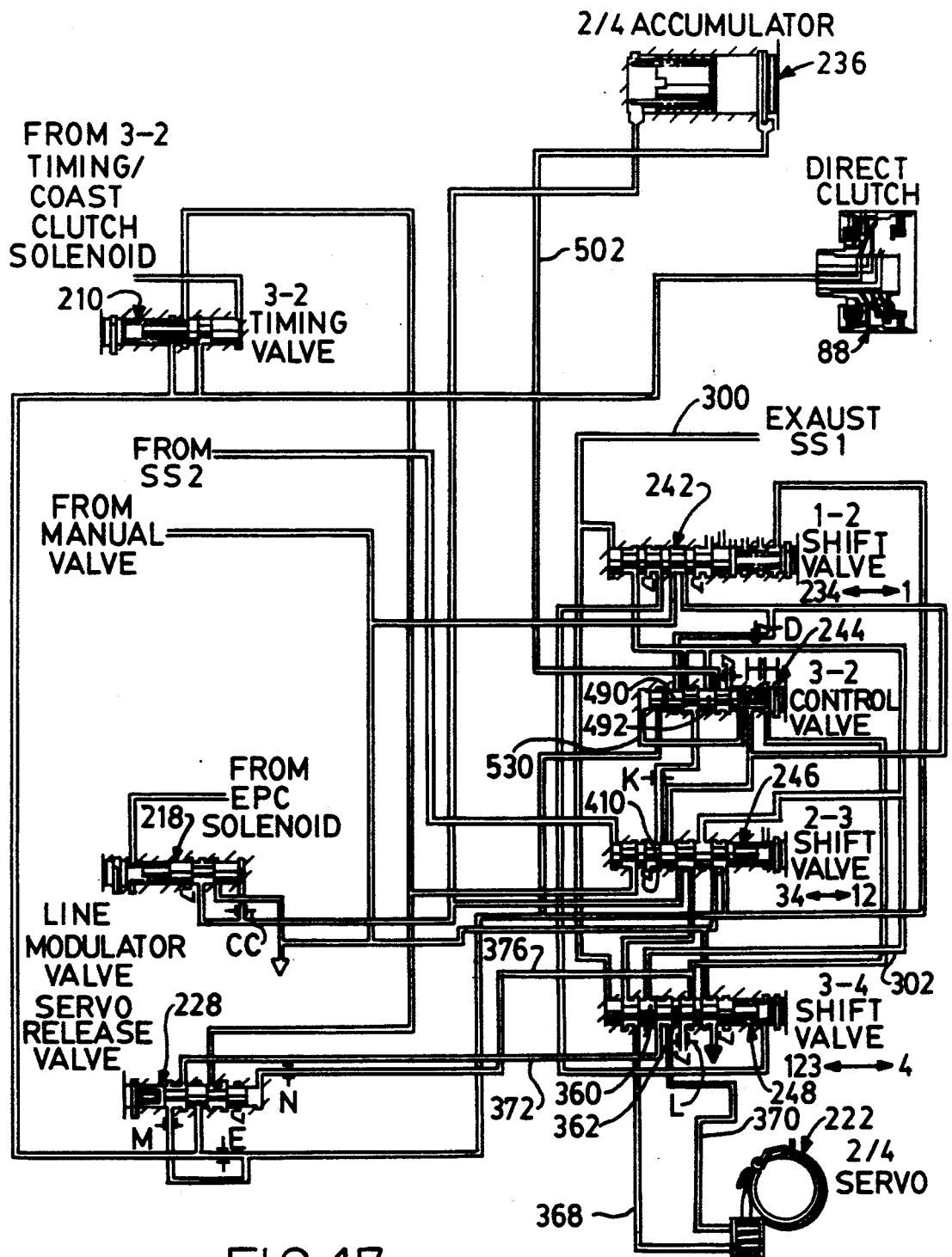
FIG. 17 is a partial valve diagram showing the 2-4 servo and direct clutch circuits when the manual valve is in the D position or in the second manual range positioning a 4-3 shift.

FIG. 17 shows the 2-4 servo and direct clutch circuits during a 4-3 downshift. The microprocessor at this time controls a 4-3 downshift by turning off shift solenoid 200 while shift solenoid 202 remains off. This causes the circuit pressure in passage 300 to become zero, thus allowing the 3-4 shift valve 248 to move in a left-hand direction. Upon movement of the 3-4 shift valve in a left-hand direction, line pressure passage 372 becomes connected to the servo release circuit as passage 370 communicates with passage 372 through the space between lands 360 and 362 on the 3-4 shift valve spool. This causes the release of the 2-4 servo. Similarly, passage 370 becomes connected to servo apply feed passage 368 through the 3-4 shift valve, specifically, through the 3-4 shift valve lands 360 and 358. This provides a cushion during the 2-4 servo release as the 2-4 servo piston is stroked to its release position.

As the 3-4 shift valve is shifted in a left-hand direction, passage 376 is connected to exhaust port 534 in the 3-4 shift valve.

Passage 520 remains pressurized with line pressure. Thus, the servo release valve remains in its left-hand position as indicated in FIG. 17 because of the differential area of lands 524 and 526.

Passage 376 is exhausted through port 374 of the 3-4 shift valve as explained. Thus, the 3-2 control valve moves in a right-hand direction since it is no longer biased in a left-hand direction by pressure acting on its right side. Thus, the accumulator passage 502 now becomes connected to exhaust port 508 in the 3-2 control valve. After the 3-2 control valve moves, pressure in passage 306 is admitted into passage 530, thus latching the 3-2 control valve in a right-hand direction.

Passage 302 communicates at this time with exhaust port 410 in the 2-3 shift valve through passage 536 and orifice K and through the space provided by lands 490 and 492 on the 3-2 control valve 244.

Figure 18:
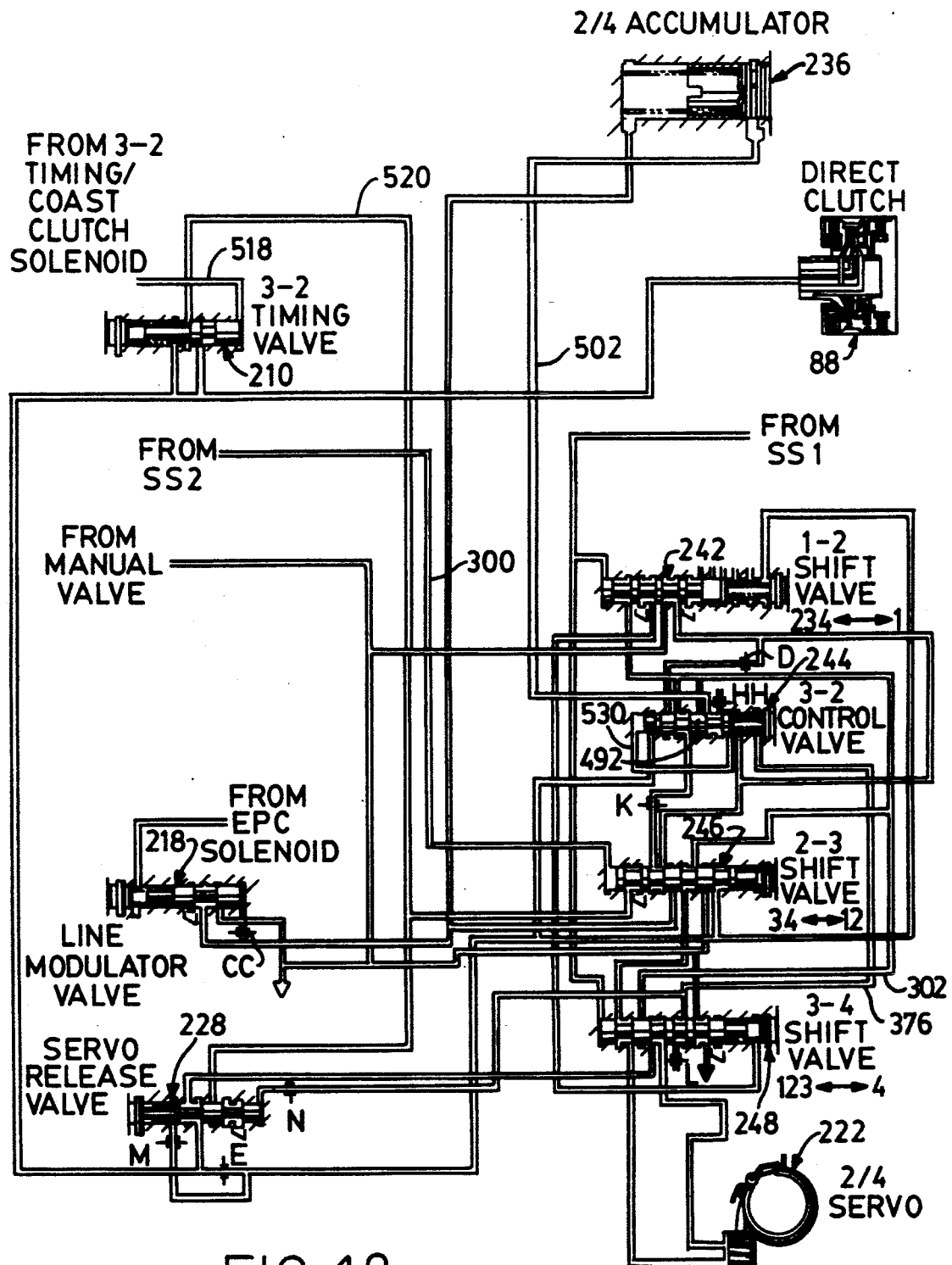
FIG. 18 is a partial valve diagram showing the 2-4 servo and direct clutch circuits when the manual valve is in the drive range position or the second manual range position during a 3-2 shift.

FIG. 18 shows the 2-4 servo and direct clutch circuits in the valve positions during a 3-2 shift. To achieve a 3-2 downshift, the microprocessor turns on shift solenoid 202 while shift solenoid 200 remains off. This causes a signal pressure in passage 300, which is distributed to the left side of the 2-3 shift valve 246, causing the shift valve to move in the right-hand direction as shown in FIG. 18. Movement of the 2-3 shift valve causes the passage 408 to be connected to the direct clutch feed passage 414, which is connected to passage 372 through the 3-4 shift valve to the servo release passage 370.

The position of the 3-2 timing valve is controlled by the microprocessor. The 3-2 timing valve is urged in a left-hand direction by the signal pressure in passage 518, which is developed by 3-2 control coast clutch solenoid 196. This allows a variable fluid flow through the passage 520 to the exhaust port 410 in the 2-3 shift valve, the latter being stroked in a right-hand direction, as explained previously. As this flow path is established, the 2-4 servo apply and the direct clutch release are synchronized.

As seen in FIG. 18, the passage 530 is pressurized, causing the 3-2 control valve to be kept in a right-hand direction. This allows the 2-4 servo to become applied without a connection to the 2-4 accumulator because the land 492 on the 3-2 control valve 244 blocks communication between passage 302 and passage 502 leading to the accumulator 236.

FIG. 19 shows the portion of the hydraulic circuit that controls the application and release of the forward clutch 106. The forward clutch is applied when the manual valve is in the D position, the 2 position or the low position during operation in the first, second, third and fourth gear. Although the forward clutch is applied in fourth gear, it does not transmit torque.

Line pressure is distributed from the pump through passage 228 to the space between manual valve lines 446 and 448. Pressure is distributed through the manual valve 194 to the forward clutch feed passage 456 and to the line pressure passage 268, which extends to the shift valve as explained previously. It also extends to the main regulator valve 226 and the line pressure modulator valve 218, as seen in FIG. 35A.

The forward clutch accumulator 238 comprises an accumulator piston 536 located in an accumulator cylinder, which defines an accumulator pressure chamber 538. An accumulator spring 540 urges the piston 536 in a left-hand direction. As pressure builds up in the feed passage 456, the accumulator piston is stroked, thereby providing a gradual pressure buildup in the forward clutch and achieving a smooth clutch engagement on start-up. When the manual valve is moved to the neutral position, the park position or the reverse position, the manual valve 194 provides an exhaust flow path for the forward clutch and the forward accumulator.

Figure 20:
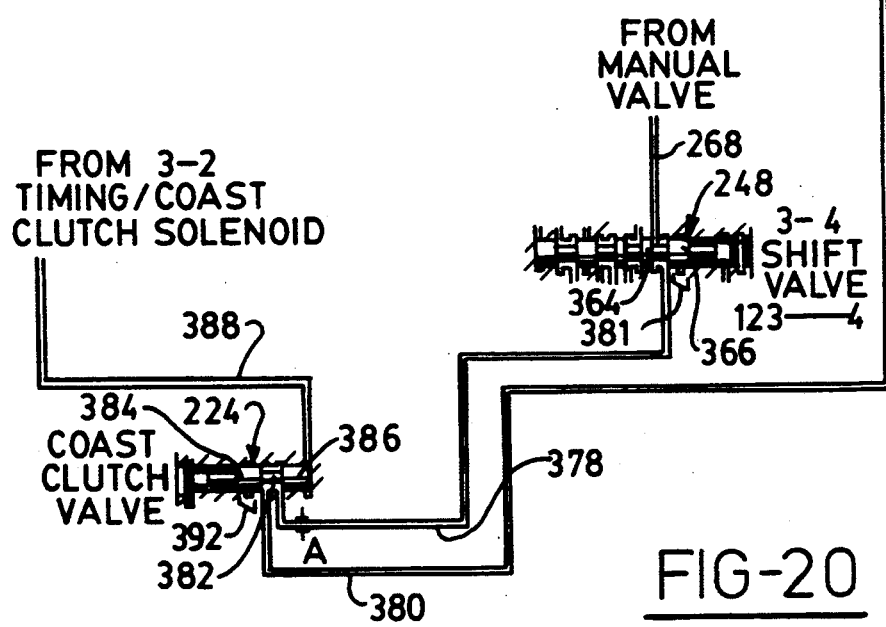
FIG. 20 is a partial valve diagram showing the coast clutch circuits.

FIG. 20 shows the coast clutch hydraulic circuit; specifically, the valve elements that have control of the application and release of the coast clutch. The coast clutch is applied during operation in the D range, second and third gear operation. It is applied also in second and third gear operation and in low range, first, second and third gear operation. This provides for coast braking during operation in those gears. Fourth gear operation always has coast braking without the need for applying the coast clutch.

The 3-2 control/coast clutch solenoid 196 controls the application of the coast clutch by changing the current to establish and disestablish a signal pressure in passage 388. When the current is zero, the pressure in passage 388 is too low to move the coast clutch, thus causing the coast clutch to become applied as passage 378 is connected to passage 380 through the space between lands 384 and 386. When the current is moderate to high, the pressure in passage 388 is high enough to move the coast clutch causing the coast clutch to release as passage 380 becomes connected to exhaust port 392.

When the clutch is applied, pressure is distributed to the manual valve through line 268 to the 3-4 shift valve 248. The shift valve distributes pressure in passage 268 to passage 378 through the space between lands 364 and 366, which is connected to the coast clutch as explained previously. When the coast clutch valve moves to the release position, it blocks passage 378 and provides an exhaust path for the clutch. During fourth gear operation in the D range, movement of the 3-4 shift valve to the right exhausts passage 378 regardless of the position of the coast clutch valve, the exhaust port being shown at 380.

Figure 36:
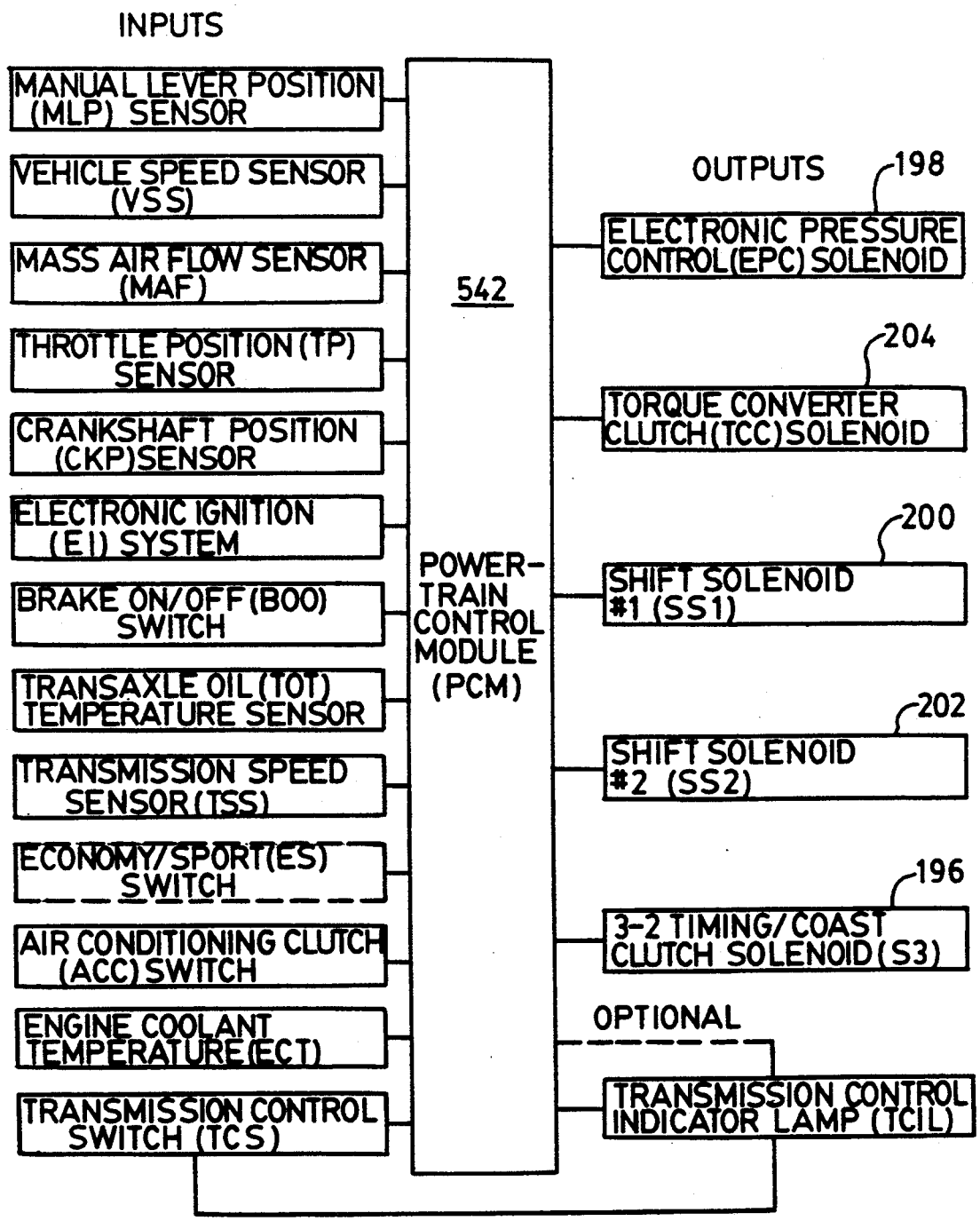
FIG. 36 is a schematic block diagram overview of the overall controls for the engine, the microprocessor, the electrohydraulic controls, and the transmission itself.

Shown in FIG. 36 is a schematic diagram of the input signals and the output signals for the microprocessor powertrain control module 542. The microprocessor receives input signals representing the position of the manual valve, the vehicle speed, the engine intake mass air flow, the engine throttle position, ignition signals comprising a crank shaft position sensor output and an ignition timing signal, a signal indicating whether the brake is on or off, a transmission oil temperature signal, a transmission turbine speed signal, an engine coolant signal and an air conditioning clutch on-off signal. The outputs of the microprocessor 542 comprise an electronic pressure control signal for the solenoid valve 198, a torque converter clutch solenoid signal for the solenoid valve 204, a signal for shift solenoid 200, a signal for shift solenoid 202 and a signal for the 3-2 control/coast clutch solenoid valve 196.

The powertrain control module 542 controls the various engine functions as well as the control of the transmission solenoid valves. This establishes control of line pressure, shift scheduling, application and release of the torque converter clutch, and engine braking during coasting.

Figure 21:
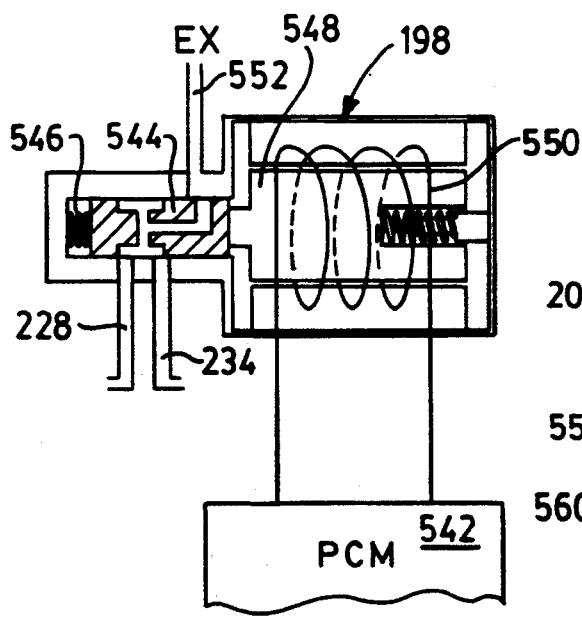
FIG. 21 is a schematic representation of an electronic pressure control solenoid valve used for establishing a so-called TV pressure.

Shown in FIG. 21 is a schematic representation of the electronic pressure control solenoid 198. This is a variable force solenoid which produces a signal in passage 234 by varying the current to the solenoid output pressure when passage 518 is controlled. This in turn varies the pressure in the line pressure circuit. In controlling the solenoid 198, the microprocessor uses information from the manual lever position sensor, the transmission oil sensor, the throttle position sensor, the electronic ignition system sensor and the vehicle speed sensor.

The solenoid valve 198 comprises a movable valve spool 544 located in a valve chamber. It is biased in one direction by valve spring 546. It is biased in the opposite direction by the armature 548 of the variable force solenoid comprising solenoid windings 550 when the windings are energized. When the solenoid current is zero, the valve spool assumes its position shown in FIG. 21 so that line pressure passage 228 becomes connected to throttle valve passage 234.

When the valve spool 544 is positioned as shown, valve lands on the spool 544 connect passages 228 and 234. When the current in the solenoid is high, the valve is shifted in a left-hand direction, thereby connecting exhaust passage 552 to passage 228 and restricting communication between passages 228 and 234. This provides a minimum throttle valve pressure.

Figure 22:
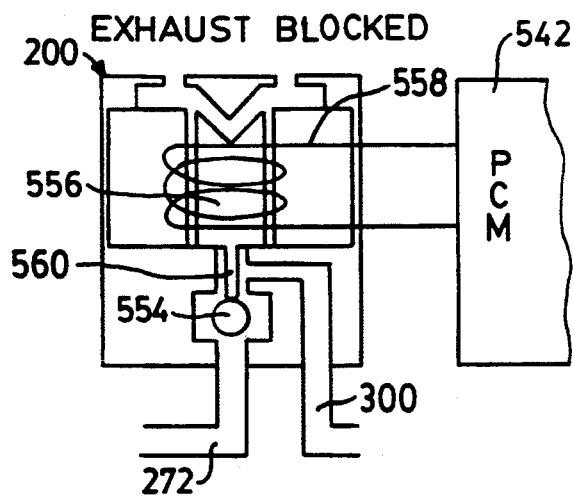
FIG. 22 is a schematic representation of a shift solenoid valve for controlling the operation of shift valves that in turn control the gearing ratio.

The shift solenoids 200 and 202 are similar. Therefore, only one of them will be described. FIG. 22 shows shift solenoid 200. It comprises a ball valve 554 located in the solenoid feed pressure passage 272. The solenoid has an armature 556, solenoid windings 558 and a valve actuator stem 562. When the solenoid is energized, the armature and the stem move downwardly, thereby unseating the valve 544 and blocking communication between signal passage 300 and exhaust ports 560. When the solenoid is turned off, the armature moves up and the ball valve 544 seals against its valve seat, thereby interrupting communication between passages 272 and 300 while opening passage 300 to the exhaust ports 560.

Figure 23:
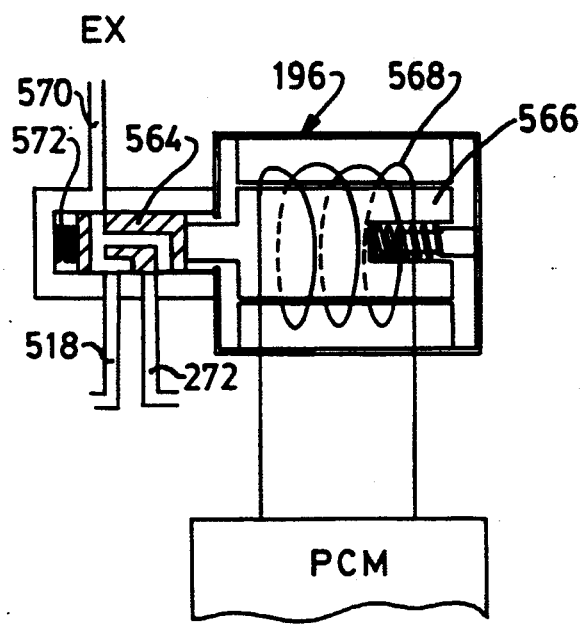
FIG. 23 is a schematic representation of the 3-2 timing coast clutch PWM solenoid valve.

FIG. 23 is a schematic view of the 3-2 control/coast clutch solenoid valve 196. It comprises a valve spool 564 and an armature 566. Solenoid windings 568 surround the armature. When the solenoid windings have zero current, signal passage 518 is connected by the valve spool 564 to the exhaust port 570. The valve spool 564 normally is urged in a right-hand direction by valve spring 572. The servo feed pressure in passage 272 is blocked by a land on the valve spool 564.

When the current in the windings 568 is high, the solenoid force shifts the valve spool 564 in a left-hand direction, thereby increasing communication between passages 518 and 272 while decreasing communication between passage 272 and the exhaust port 570.

Solenoid 196 is a variable force solenoid which develops a variable pressure in passage 518 depending upon the current in windings 568.

Figure 24:
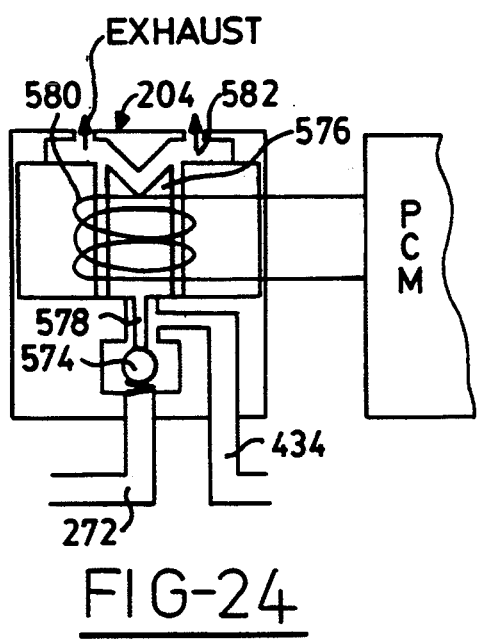
FIG. 24 is a schematic representation of a torque converter clutch solenoid valve.

FIG. 24 is a schematic representation of the torque converter clutch solenoid valve. This is a pulse width modulated solenoid valve. By varying the pulse width of the solenoid circuit, the pressure in signal passage 434 is varied.

The bypass clutch solenoid valve 204 shares the same solenoid feed passage 272 with the other solenoid valves. It includes a ball valve 574 located in the feed passage 272. The armature 576 for the valve 204 has a stem 578 that unseats the valve when the pulse width is high. Solenoid windings 580 are energized with a pulse width signal to establish controlled communication between passages 272 and 434.

When the solenoid valve 204 is off, passage 434 communicates directly with exhaust ports 582 as the ball valve 574 becomes seated.

FIG. 35C shows in more detail the construction of the 2-4 servo. It comprises a cylinder 584 which receives servo piston 586. The piston and the cylinder cooperate to define a servo apply pressure chamber 588 and the servo release pressure chamber 590. A brake band actuator 592 extends through housing portion 594 and is received in central opening 596 in the piston 586. The piston is urged in a left-hand direction by a low rate spring 598 seated on the housing portion 594. A high rate spring 600 seated on spring seat 602 supplements the force of spring 598. Spring seat 602 is fixed to the actuator 592. Initial build-up of pressure in servo apply chamber 588 compresses the spring 598 and takes up slack in the brake band assembly. Continued pressure build-up will cause compression of the spring 600 as the piston 586 moves relative to the spring seat 602.

SUMMARY OF THE SHIFT LOGIC

When the manual valve is moved from park or neutral to the reverse position, the manual valve connects line pressure passage 228 with the reverse passage 316. The split port design on the manual valve, as previously explained, allows the reverse clutch to be applied before application of the low and reverse clutch. This is accomplished by feeding the reverse clutch through the 1-2 shift valve and through passage 314 directly to the reverse clutch without any intervening flow control orifice. The oil flow path to the low and reverse clutch, on the other hand, includes orifice J adjacent the manual valve. Oil flow is controlled by orifice J. It then passes through the low and reverse modulator valve 240 to the low and reverse clutch. At the same time, the low and reverse clutch accumulator 206 becomes pressurized since it is connected directly to the low and reverse clutch through the low and reverse modulator valve 240.

The application of the low and reverse clutch follows application of the reverse clutch also by reason of the calibration of the volume of the low reverse accumulator. This provides shift cushioning during reverse engagement. FIG. 34A is a schematic diagram of the flow path for the actuating pressure for the reverse clutch and the low and reverse clutch. Fluid pressure from passage 228 is distributed directly to the reverse clutch, but it must pass through the orifice J before reaching low and reverse clutch.

FIG. 34B shows the flow path during reverse disengagement. The low and reverse accumulator is exhausted through passage 454 and through the exhaust port in the manual valve. The orifice J is not involved in this flow path. The reverse clutch also is exhausted through the passage 316 and through the exhaust port in the manual valve.

If the reverse position of the manual valve is selected when the vehicle is moving at a high speed, the reverse clutch 182 is exhausted through exhaust port 318 in the 1-2 shift valve as the processor develops a signal in passage 300 that will shift the 1-2 shift valve in a right-hand direction under this condition. Thus both the low and reverse clutch 152 and the reverse accumulator 206 will be exhausted through the orifice J and then through the exhaust port 318 in the 1-2 shift valve. This is seen in FIG. 34C.

Above a calibratable vehicle speed, the reverse engagement is locked out. This is accomplished by routing the reverse and low feed passage and the reverse clutch feed passage through the 1-2 shift valve. The valve is downshifted at this time by the processor as the vehicle speed exceeds the calibratable value, thus exhausting the clutches in the accumulator while blocking the feed passages to these elements.

If the manual valve is moved from the park or neutral position to the D position, the overdrive ratio and the drive ratios are obtained. The split port 604 in the manual valve 194, as seen in FIG. 35A, will permit a transfer of line pressure from passage 222 to passage 268 without pressurizing passage 456. The split port 604 will permit exhausting of the passage 268 through the manual valve and exhausting of passage 456 through the manual valve when the manual valve is in the neutral position, as shown in FIG. 35A. The corresponding split port for the reverse line pressure passage and the low and reverse clutch feed passages 316 and 454, respectively, is shown in FIG. 35A at 606. This port, as explained previously, will permit exhausting of passages 454 and 316 through the exhaust port of the manual valve, but will prevent communication between passage 316 and passage 454 when the manual valve is moved from the neutral position to the reverse position.

When the manual valve is moved to the drive position, line pressure in passage 228 will be transferred to the forward clutch feed passage 456 through the orifice R located next to the manual valve spool. Also passage 268 will be connected to the line pressure passage 228 through the manual valve. Passage 268 is connected to passage 378 through the 3-4 shift valve and through the coast clutch control valve 224 to the coast clutch feed passage 380. Orifice A located next to the coast clutch control valve 224 is in this feed passage so that the rate of fill of the coast clutch is controlled by the orifice.

Figures 33A, 33B:
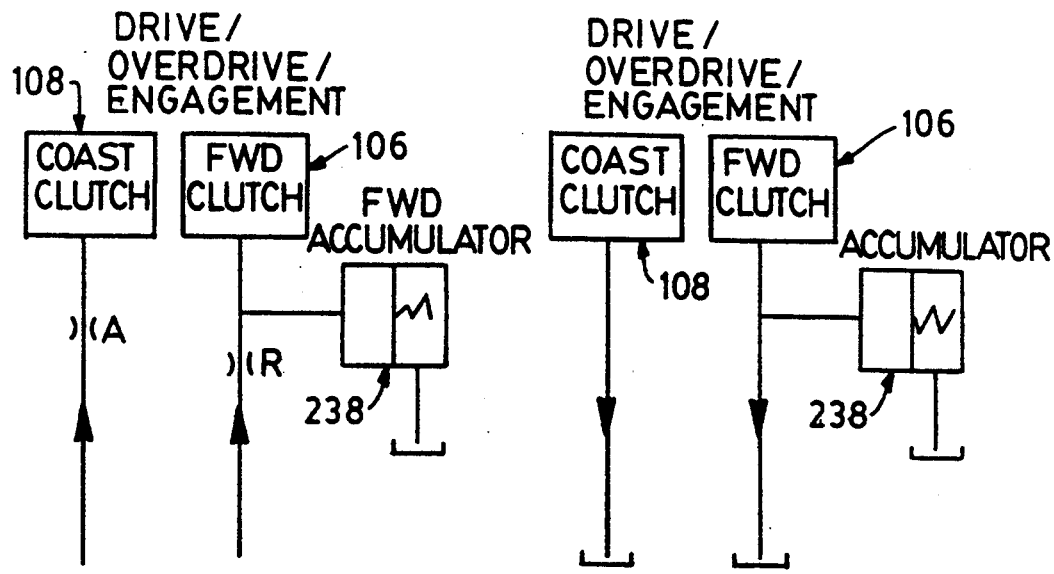
FIGS. 33A and 33B show the shift feel logic for the drive/overdrive engagement and the drive/overdrive disengagement.

Forward clutch engagement is controlled also by the forward clutch accumulator 238 as well as the orifice R, as indicated in FIG. 33A.

When the manual valve is moved from the D position to the neutral position, the coast clutch 108 is exhausted directly through the line 380 and to the exhaust port 392 in the coast clutch valve 224 since a signal is present in the signal passage 518. Under these conditions, the forward clutch is exhausted directly through the split exhaust port 604 in the manual valve without passing through orifice R.

The control system includes an overdrive cancel switch which can be selected by the operator. If the overdrive cancel switch is activated, the microprocessor will respond by causing the 3-2 coast clutch control solenoid valve 196 to eliminate the pressure signal in passage 518, allowing the coast clutch valve 224 to shift to the right. This connects the coast clutch to the passage 378 through the passage 380, which cushions the clutch application. The application of the coast clutch thus is delayed to ensure that the forward clutch is applied before the coast clutch is applied.

Figures 32A, 32B:
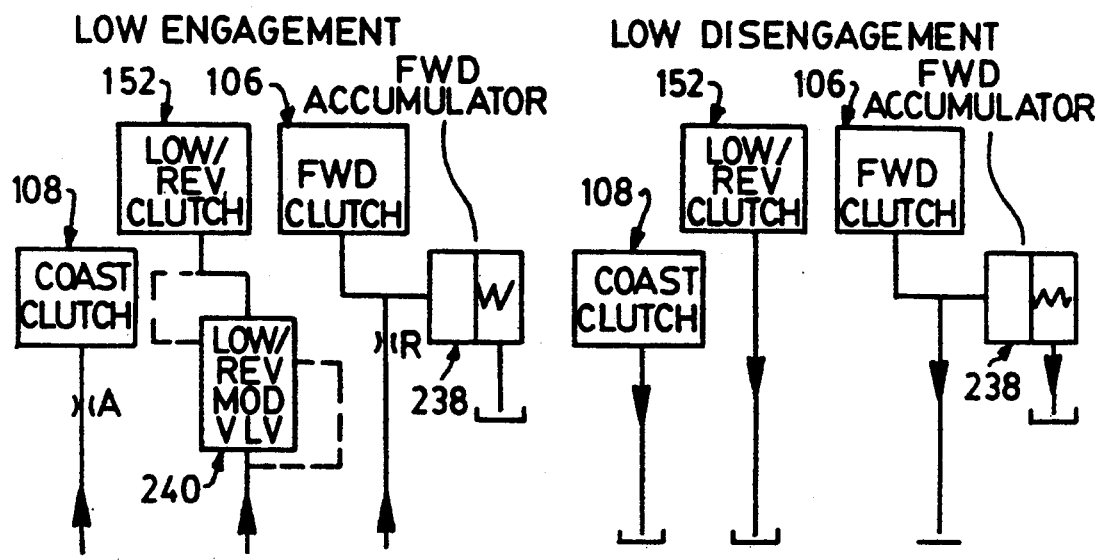
FIGS. 32A and 32B show the shift feel logic for a low engagement of the forward clutch and the reverse-and-low clutch and the low disengagement of the forward clutch and the low-and-reverse clutch, respectively.

FIGS. 32A and 325 show the shift logic for low engagement and low disengagement, respectively. This is similar to the logic shown in FIGS. 33A and 335, except that the flow circuit for the pressurized fluid for the low and reverse clutch is illustrated. During low engagement, fluid pressure passes through passage 442 and through the low and reverse valve 240. Passage 442 communicates with the low and reverse clutch 152 through the valve 240. Low disengagement occurs as the low and reverse clutch is exhausted through the low and reverse valve and through the exhaust port in the manual valve. This is indicated in FIG. 325. When the manual valve is moved from the D position to the park or neutral position, the forward clutch, the forward clutch accumulator 238 and passage 268 are exhausted rapidly through the manual valve.

The reverse lockout feature that was described previously occurs upon movement of the manual valve to the reverse position from the overdrive position or the 2 position or the low position. This activates a signal in passage 300 which downshifts the 1-2 shift valve. This closes the reverse and low reverse circuit and opens the low reverse and reverse circuit to exhaust, thus causing the transmission to assume a neutral condition. This prevents overloading of the low reverse and reverse friction elements.

When the manual valve is in the D range, an upshift from the first to the second ratio occurs as shift solenoid 200 is turned off, thereby allowing the 1-2 shift valve to upshift by action of its valve spring. Passage 306 then becomes connected to line pressure passage 308 through the 1-2 shift valve. Passage 306 feeds pressure to passage 486 through orifice D located near the 3-2 control valve.

The 3-2 control valve connects passage 486 to passage 302. Passage 302 pressurizes the 2-4 accumulator and the apply side of the 2-4 servo, which cushions the application of the 2-4 brake band by a control pressure rise. The back pressure on the 2-4 accumulator is controlled by the line modulator valve output pressure in passage 372, which is calibrated as a function of engine torque and is determined by the value of the throttle pressure in passage 234. Passage 302 is connected to passage 370 and to the apply side of the 2-4 servo through passage 370. This hydraulic logic is illustrated in FIGS. 31A and 31B.

When the manual valve is in the D range, a 2-3 shift is initiated when the solenoid 202 is turned off. This allows the 2-3 shift valve 246 to upshift because the signal pressure in passage 320 is zero. The upshifting of the 2-3 shift valve pressurizes passage 312 as passage 268 becomes connected through the 2-3 shift valve to the passage 312. The servo apply feed passage 368 becomes connected to passage 372 through the upshift at the 2-3 shift valve. The pressure in passage 372 is calibratable to a level just high enough to hold the brake band from slipping and yet allow enough braking action to allow the servo release area to release the brake band in synchronism with the application of the direct clutch.

The direct clutch and the servo release chamber of the 2-4 servo are filled by the pressure in passage 312, which is connected to the servo release area through the servo release valve, through passage 372 and through passage 370. Orifice E is in that flow circuit. The servo release valve 220 is held in the position shown by its valve spring, which ensures that the direct clutch and the servo release pressures rise simultaneously. As the servo release pressure rises, it gradually releases the brake band for the 2-4 servo in synchronism with the direct clutch application.

Figure 30C:
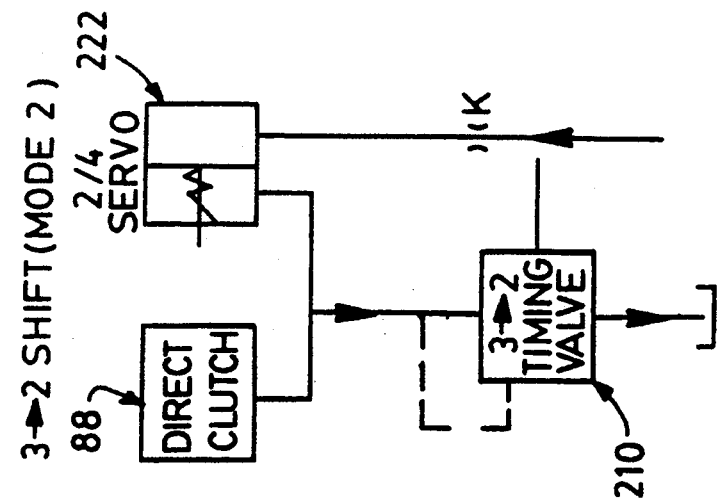
FIGS. 30A, 30B and 30C show the hydraulic shift feel logic for a 2-3 shift, a 3-2 shift (low speed mode) and a 3-2 shift (high speed mode), respectively.
Figure 30B:
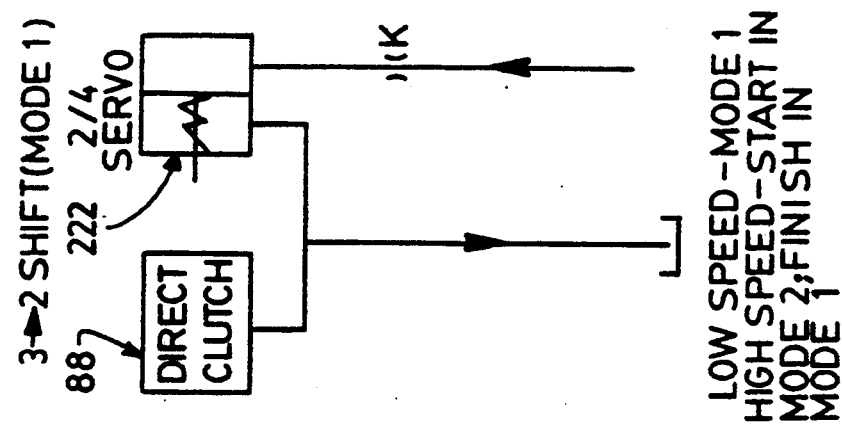
Figure 30A:
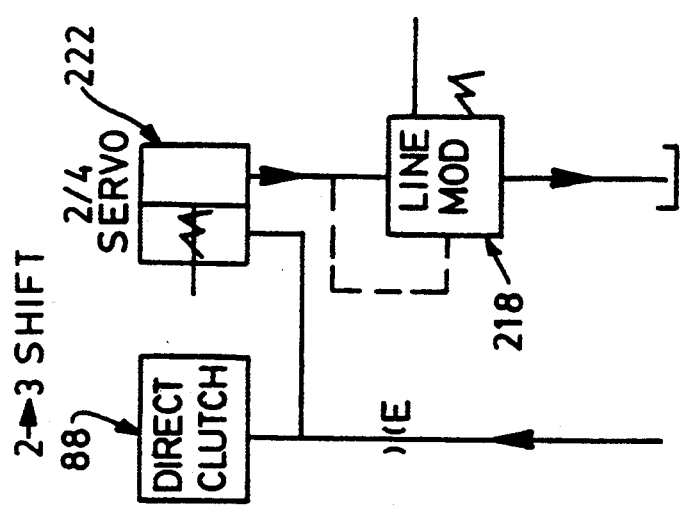

When the pressure in passage 312 rises above the spring load of the 3-2 control valve, the force acting on the differential area of the 3-2 control valve lands 490 and 494, it causes the 3-2 control valve to shift. This pressurizes passage 530, as passage 530 is brought into communication with passage 306. This holds the 3-2 control valve in the right-hand position against the force of the valve spring for a 3-2 downshift. The 2-4 accumulator also is exhausted when the 3-2 control valve is shifted in preparation for a 3-4 upshift. This shift logic is schematically illustrated in FIGS. 30A, 30B and 30C. In the case of FIG. 30C, the downshift occurs at a high speed initially. The processor will distribute a control signal to passage 518 under these circumstances, thereby causing the direct clutch and the release side of the 2-4 servo to exhaust through the timing valve 210 as flow from passage 414 is restricted as it passes through the timing valve to passage 520. A flow path to the apply side of the servo 222 includes orifice K which is located adjacent the 2-3 shift valve as seen in FIG. 35B.

When the manual valve is in the D range, a 3-4 shift is initiated when solenoid 200 is energized, thereby moving the 3-4 shift valve to the right from the position shown in FIG. 35B. Line pressure in passage 312 prevents the 1-2 shift valve from shifting, notwithstanding the fact that a pressure signal in passage 300 then exists.

The 3-4 shift valve connects the servo apply passage 368 to passage 302 and connects a servo release passage 370 to exhaust port 534 in the 3-4 shift valve. Orifice L is located in the exhaust flow path adjacent the 3-4 shift valve. Passage 376 also becomes pressurized as line pressure passage 268 becomes connected to passage 376 through the 3-4 shift valve. Passage 376 extends to the 3-2 control valve, which shifts the 3-2 control valve to connect passage 302 to the 2-4 servo accumulator feed passage 502. This flow path includes orifice D located directly adjacent the 3-2 control valve. During the repositioning of the 3-4 shift valve and the 3-2 control valve, the servo apply pressure is allowed to fall so that it can be brought to line pressure with the 2-4 accumulator valve, thus cushioning the 3-4 upshift.

The servo release shuttle valve, which connects and disconnects the direct clutch to the servo release area, is shifted to the disconnect position by pressure in passage 376. This prevents the loss of direct clutch pressure during the exhaust of the servo release area, thus avoiding a momentary downshift in second gear rather than an upshift in fourth gear.

Figure 27A:
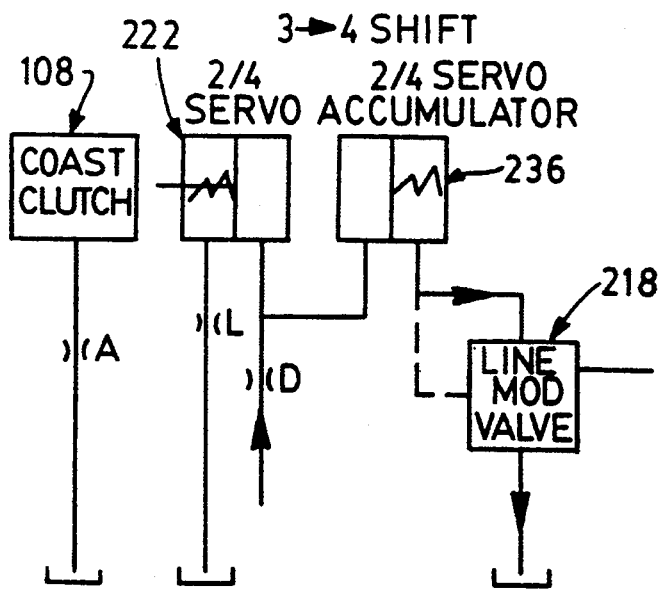
FIGS. 27A and 27B show in schematic form the hydraulic shift feel logic for a 3-4 shift and a 4-3 shift, respectively.
Figure 27B:
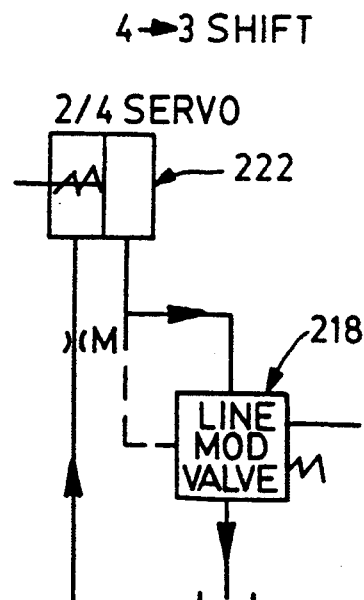

Pressure in passage 408 acts on the differential areas of the shuttle valve lands when the shuttle valve is shifted against the force of the spring by pressure in passage 376, which holds the servo release shuttle valve in its disconnect position during a 4-3 downshift. Upshifting of the 3-4 shift valve also exhausts passage 378 through exhaust port 380 in the 3-4 shift valve. This prevents application of the coast clutch in fourth gear, which would cause a driveline tie-up. This shift logic for a 3-4 upshift and a 4-3 downshift is illustrated in FIGS. 27A and 27B where the functions of the orifices A, L, D and M are indicated. Orifice A, as mentioned earlier, is located next to the coast clutch valve. Orifice L is located next to the 3-4 shift valve. Orifice D is located next to the 3-2 control valve, and orifice M is located directly adjacent the servo release shuttle valve.

On a 4-3 downshift with the manual valve in the D range, the shift is initiated when the shift solenoid 200 is de-energized. This causes the 3-4 shift valve to downshift under spring load. Downshift of the 3-4 shift valve connects the servo apply area to passage 370 and to passage 372, which is the output pressure passage for the line modulator valve. Also, the servo release area of the 2-4 servo is connected to passage 372, which in turn is connected to line pressure passage 312 through orifice M located directly adjacent the servo release valve. The rising pressure in the servo release area gradually releases the brake band, thus completing the shift. The quality of the shift is controlled by the calibrated orifice M.

The servo release valve is held in its left-hand position by the pressure in passage 408, which pressurizes the differential area on the lands of the servo release valve. This prevents loss of pressure in the direct clutch and prevents an unwanted 4-2/2-3 shift.

Passage 376 is exhausted through orifice 534 of the 3-4 shift valve on a 4-3 downshift, thereby allowing the 3-2 control valve to shift against its spring by the pressure that exists in passage 530 and by the pressure in passage 506. This exhausts the 2-4 accumulator as passage 502 becomes connected to 3-2 control valve orifice 508. This prepares the 3-2 control valve for a 3-4 upshift.

This shift logic for 3-4 upshifts and 4-3 downshifts is illustrated in schematic form in FIGS. 27A and 27B.

Figure 28A:
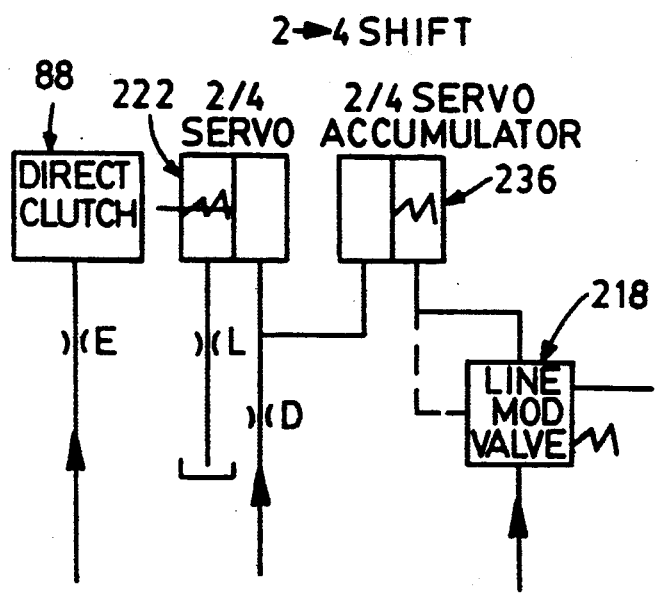
FIGS. 28A and 28 show the hydraulic shift feel logic for a 2-4 shift any 4-2 shift, respectively.
Figure 28B:
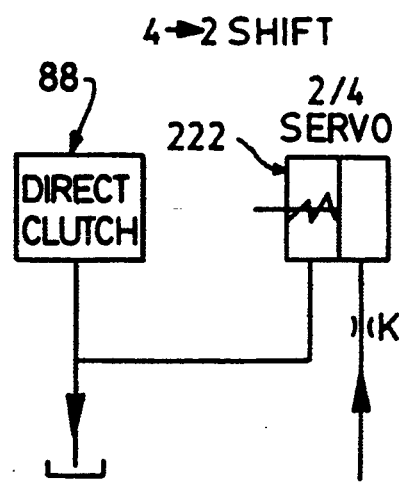

If the manual valve is in the D range and the overdrive cancel switch is off, a 4-2 downshift is accomplished by commanding a partial 4-3 downshift and then commanding a 3-2 downshift. The shift is initiated when solenoid 200 is off. This causes the 3-4 shift valve to move in a left-hand direction. The 4-3 downshift is interrupted when the servo release pressure in passage 370 falls sufficiently to cause the servo release piston to stroke and to release the band. The partially stroked servo then is used as an accumulator to maintain direct clutch pressure during the 3-2 downshift phase of the shift. This allows the cushioning of the brake band application for the 2-4 servo as in a normal 3-2 shift. The 3-2 downshift portion of the 4-2 downshift function is initiated when shift solenoid 202 is energized, which causes the 2-3 shift valve to shift in a right-hand direction. This allows the 2-3 shift valve to exhaust the direct clutch and the servo release area as passage 302 is brought into communication with exhaust port 508 of the 3-2 control valve. The release of the direct clutch completes the shift. This shift feel logic is illustrated in schematic form for a 2-4 shift in FIG. 28A and for a 4-2 shift in FIG. 28B.

A 3-2 downshift in the D range with the overdrive cancel switch off is initiated when shift solenoid 202 is energized. This causes the 2-3 shift valve to shift in a right-hand direction. The downshifting of the 2-3 shift valve exhausts passage 408 through 2-3 shift valve exhaust port 410. The servo apply area is connected to passage 302 through passage 370 and the 2-3 shift valve. Passage 536 communicates with passage 306 through the 2-3 shift valve and is pressurized. Passage 306 becomes pressurized as it is brought into communication with passage 376 through the 3-2 control valve. The 3-2 control valve is held in its left-hand position by pressure in passage 530. The 3-2 downshift quality is controlled by line pressure and the regulated direct clutch pressure.

Direct clutch pressure is regulated as servo release pressure from servo 222 and direct clutch pressure are exhausted during the downshift. Direct clutch pressure is regulated to a calibrated level that is determined by the commanded signal pressure in passage 518 from the 3-2 control/coast clutch control solenoid valve 196, which acts on the 3-2 timing valve 210 shown in FIG. 35A.

Orifice K, which is located adjacent the 2-3 shift valve as seen in FIG. 35B, is in the pressure flow path to the 2-4 servo as indicated in FIGS. 30B and 30C. The 3-2 timing valve is functional during the beginning of the 3-2 downshift at high speeds. After the speed falls below a calibratable value, the flow path is as indicated in FIG. 30B.

As indicated in FIG. 30A, the orifice E located next to the servo release valve is in the flow path to the direct clutch, but it is not in the flow path during the exhaust of the direct clutch as shown in FIG. 30B.

A 3-1 downshift, when the manual valve is in the D range and the overdrive cancel switch is off, is initiated when solenoids 202 and 200 are energized simultaneously. This causes the 2-3 shift valve 246 and the 1-2 shift valve 242 to downshift as signal pressures in passages 320 and 300 are developed. The direct clutch and the servo release area are exhausted rapidly through passage 408. The 2-4 servo is not applied because it is held off by the servo spring and the pressure in the release side of the servo. The servo apply area is exhausted through the exhaust port 304 in the 1-2 shift valve and through passage 302, so the servo is not applied. No cushioning nor special circuitry is required for this shift.

The fluid logic for the 1-3 shift and the 3-1 shift, as described above, is illustrated schematically in FIGS. 29A and 29B, respectively.

A 2-1 downshift, when the manual valve is in the D position and the overdrive cancel switch is off, is initiated when shift solenoid valve 200 is on. This creates a pressure in passage 300, which shifts the 1-2 shift valve in a right-hand direction. The servo apply area is exhausted, as explained previously, through the passage 302 and the exhaust port 304 of the 1-2 shift valve. A nonsynchronous 2-1 downshift takes place when the servo is released. The servo is released under the influence of the spring pressure in the servo. The fluid logic for the 2-1 shift is shown in FIG. 31B and corresponding logic for the 1-2 shift is shown in FIG. 31A. Only orifice D located near the 3-2 control valve, as seen in FIG. 35B, enters into the flow path in the case of the 1-2 upshift, but it does not enter into the exhaust flow path for the servo or the 2-4 accumulator during a 2-1 downshift.

If the overdrive cancel switch is on, the shifts are similar except that the coast clutch is applied. The application of the coast clutch occurs by reducing the pressure in passage 518, which connects passages 378 and 380 through the coast clutch valve 224. This allows the coast clutch to be pressurized by the pressure in passage 378. The application of the coast clutch is controlled by orifice A next to the coast clutch valve 224.

If the manual valve is in the D range with the overdrive cancel switch off and a shift of the first, second or third ratio is desired, the processor will exhaust the coast clutch, thereby commanding a 3-2 coast clutch solenoid pressure in passage 518. This exhausts the passage 380 through the orifice 392 at the coast clutch valve 224.

When the transmission manual valve is in the D range and the operator "pulls in" the manual valve to the low speed ratio position, a computer controlled shift calibrated with vehicle speed will occur. The overdrive cancel switch is off. In these circumstances, the low range line pressure passage 472 will be pressurized as explained previously. This pressure acts on the right end of the pull-in valve 208, which shifts the valve, thereby connecting the solenoid feed passage 272 to signal passage 320. This also connects passage 334 to signal passage 336. The 2-3 shift valve is downshifted whenever shift solenoid 202 is de-energized. Simultaneously with the manual valve pull-in, the microprocessor switches the logic of the shift solenoids in the ratio selection. For example, the second gear logic then will require solenoids 200 and 202 to be energized rather than both shift solenoids 200 and 202 to be de-energized. The microprocessor under the manual valve pulling conditions would sequence a 3-2/2-1 downshift or a 2-1 downshift if the vehicle speed is above that in which a manual low first gear shift would be permitted.

If the manual valve is moved from the drive position to the manual low position and the transmission is in first gear, that shift is initiated when the manual valve pressurizes the manual low pressure passage 332. The processor will de-energize shift solenoid 202 because of the manual low shift logic mentioned above. This does not affect the shift because the 1-2 shift valve already is in the downshift position. Thus, manual low pressure passage 472 and the connecting passage 332 communicate through the 1-2 shift valve with passage 474, which feeds the low reverse clutch by way of the low reverse regulator valve 240. This shift is completed when the low reverse clutch is applied. The shift quality is controlled by the low reverse regulator valve output pressure.

If the vehicle is travelling at a high speed and the transmission is in the drive range D, the manual low pull-in shift is initiated when the manual valve is moved to the low position. The processor then will determine whether the shift will be a 3-2 shift followed by a 2-1 shift or a 2-1 shift, as mentioned above.

If the processor commands third gear under these conditions, solenoid 202 is energized. This prevents the 2-3 shift valve from downshifting because signal pressure passage 332 is connected through the pull-in valve to passage 336, which pressurizes the right-hand end of the 2-3 shift valve. If the transmission is in the overdrive range at the time of the manual low pull-in shift, solenoid 200 is de-energized and solenoid 202 is energized simultaneously. This causes a 3-4 shift valve to downshift since signal pressure in passage 300 is exhausted. After the vehicle speed drops sufficiently, the processor then commands a 3-2 shift followed by a 2-1 shift.

If the manual valve is moved to the pull-in position and the vehicle speed is moderate rather than high, second gear will be commanded initially during the overdrive pull-in shift. Shift solenoid 200 will be de-energized causing a 4-2 shift since the signal pressure in passage 300 acts on both the 1-2 shift valve and the 3-4 shift valve, causing both shift valves to move to the left. If the pull-in shift is made from a third gear ratio, the computer logic will automatically command a 3-2 downshift without affecting the shift solenoid status. A 2-1 downshift then will be commanded when the vehicle speed drops to the calibrated lower level. In the event of a loss of signal due to an interruption of voltage to the solenoid valves, the transmission will default to the third gear and the coast clutch automatically will be applied because of a loss of the signal pressure in passage 518. Because of the logic change in the gear selection in the manual low range, second gear can be obtained rather than third gear. This feature provides limp-home capability for the vehicle in the event of a loss of voltage.

The 2-4 accumulator is used for two different ratio changes; namely, the shift from first to second and the shift from third to fourth. This is made possible, as explained previously, by the 3-2 control valve. If a shift is made from third to second, the accumulator should not stroke. Thus, the 3-2 control valve blocks the accumulator feed passage 502 and exhausts the accumulator through port 508. This allows the accumulator to stroke to the right and condition it for a 3-4 upshift. This is accomplished since the 3-4 shift valve will connect the line pressure passage 268 to passage 376, which strokes the 3-2 control valve to the left.

The 3-2 control valve is stroked to the right whenever passage 506 is pressurized. That will cause passage 530 to be pressurized which latches the 3-2 control valve in a right-hand direction. This latching feature is needed because if the transmission returns to the second gear ratio, passage 506 no longer is pressurized; but it is necessary nonetheless for the 3-2 control valve to remain in the right-hand position. Thus, there is a need for both pressure areas at the left-hand end of the 3-2 control valve to be pressurized to hold the valve in its right-hand position so that it is ready to provide an accumulator action on a shift to the fourth ratio.

As previously explained, the line modulator valve 218 provides shift feel quality for all three upshifts. In the case of a 1-2 shift and a 3-4 shift, it provides a regulated pressure in passage 372 for the accumulator 236. In the case of the 2-3 shift, it provides a regulated pressure in passage 372, which is distributed through the 2-3 shift valve to passage 370 and through the 3-4 shift valve to the apply side of the 2-4 servo. Thus, the back pressure on the servo is controlled by the line modulator valve which influences the 2-3 shift.

The servo regulator valve 220 controls a 4-3 downshift. Since the apply side of the 2-4 servo is connected to passage 370 through the 3-4 shift valve and through the upshifted 2-3 shift valve to passage 372, the pressure in passage 372 is modulated by the valve 218, as was explained previously.

Having described the preferred embodiment of the invention, what we claim and desire to secure by U.S. Letters Patent is:

1. An automatic transmission for use in a vehicle driveline comprising multiple ratio gearing, adapted to provide multiple torque flow paths from a driving member to a driven member, a fluid pressure operated brake means for anchoring a reaction member for said gearing;

first clutch means for delivering torque from said driving member to one torque input member of said gearing while said brake means is applied to establish one gear ratio;

second clutch means for delivering torque from said driving member to another torque input member of said gearing while said brake means is applied to establish another gear ratio, said first and second clutch means being applied simultaneously while said brake means is released to establish a gear ratio intermediate said one gear ratio and said other gear ratio; and a fluid pressure accumulator means for cushioning application of said brake means during establishment of said one gear ratio and said other gear ratio;

said brake means including a double action servo having a piston that partially defines a brake apply pressure chamber and a brake release pressure chamber;

a pressure accumulator in fluid communication with said brake apply pressure chamber during operation of said transmission in said one gear ratio and said other gear ratio; and control valve means for interrupting communication of said pressure accumulator with said brake apply pressure chamber when said intermediate gear ratio is established and establishing such communication when said one gear ratio and said other gear ratio are established.

2. The combination as set forth in claim 1 wherein said transmission comprises a control valve circuit including a line pressure source;

a main regulator valve means in said circuit for regulating pressure from said pressure source; and means for establishing a torque pressure signal indicating the magnitude of torque delivered by said driving member;

said regulator valve means being in communication with said torque pressure signal whereby optimum torque capacity of said brake means and said first and second clutch means is maintained during ratio changes into said one gear ratio and into said other gear ratio.

3. The combination as set forth in claim 2 wherein said transmission comprises a control valve circuit including a pressure source, first and second shift valve means for selectively distributing pressure from said pressure source to each of said clutch means and to said brake means; and shift solenoid valve means for developing shift pressure signals in response to changing operating variables including driven member speed and torque on said driving member, said shift pressure signals being distributed to and actuating said first and second shift valve means;

each shift valve means being in communication with said brake apply pressure chamber, at least one shift valve means being in communication with said servo release pressure chamber whereby ratio changes between each of four speed ratios is achieved; and means for distributing regulated pressure from said regulator valve means to said brake apply chamber through at least one shift valve means whereby optimum torque capacity of said brake means is maintained during ratio shift between two intermediate gear ratios between the lowest gear ratio and the highest gear ratio.

4. The combination as set forth in claim 1 including separate fluid pressure feed passage means and fluid pressure return passage means communicating with said first and second clutch means and with said brake means, and a calibrated flow control orifice in said pressure feed passage means for controlling engagement timing, the fluid return flow in said return passage means being unrestricted thereby effecting rapid disengagement of said first and second clutch means and said brake means.

5. The combination as set forth in claim 1 including a servo release valve means communicating with said servo release pressure chamber for modulating the ratio of flow of fluid from said release pressure chamber upon application of said brake means.

6. A geared transmission for establishing torque flow paths from a driving member to a driven member comprising fluid pressure operated brake means for braking a reaction member that is common to each of two torque flow paths, each torque flow path having a discrete gear ratio;

first clutch means for delivering torque from said driving member to one torque input member of said transmission while said brake means is applied to establish one gear ratio;

second clutch means for delivering torque from said driving member to another torque input member of said transmission while said brake means is applied and said first clutch means is applied to establish another gear ratio;

said first and second clutch means both being applied while said brake means is released to establish a gear ratio intermediate said one gear ratio and said other gear ratio;

said brake means including a double action servo having a piston that partially defines a brake apply pressure chamber and a brake release pressure chamber;

a pressure accumulator in fluid communication with said brake apply pressure chamber during operation of said transmission in said one gear ratio and said other gear ratio; and control valve means for interrupting communication of said pressure accumulator with said brake apply pressure chamber when said intermediate gear ratio is established and establishing such communication when said one gear ratio and said other gear ratio are established.

7. The combination as set forth in claim 6 wherein said transmission comprises a control valve circuit including a line pressure source;

a main regulator valve means in said circuit for regulating pressure from said pressure source; and means for establishing a torque pressure signal indicating the magnitude of torque delivered by said driving member;

said regulator valve means being in communication with said torque pressure signal whereby optimum torque capacity of said brake means and said first and second clutch means is maintained during ratio changes into said one gear ratio and into said other gear ratio.

8. The combination as set forth in claim 7 wherein said transmission comprises a control valve circuit including a pressure source, first and second shift valve means for selectively distributing pressure from said pressure source to each of said clutch means and to said brake means; and shift solenoid valve means for developing shift pressure signals in response to changing operating variables including driven member speed and torque on said driving member, said shift pressure signals being distributed to and actuating said first and second shift valve means;

each shift valve means being in communication with said brake apply pressure chamber, at least one shift valve means being in communication with said servo release pressure chamber whereby ratio changes between each of four speed ratios is achieved; and means for distributing regulated pressure from said regulator valve means to said brake apply chamber through at least one shift valve means whereby optimum torque capacity of said brake means is maintained during ratio shift between two intermediate gear ratios between the lowest gear ratio and the highest gear ratio.

9. The combination as set forth in claim 6 including a servo release valve means communicating with said servo release pressure chamber for modulating the ratio of flow of fluid from said release pressure chamber upon application of said brake means.

10. An automatic transmission for use in a vehicle driveline comprising multiple ratio gearing, adapted to provide multiple torque flow paths from a driving member to a driven member, a fluid pressure operated brake means for anchoring a reaction member for said gearing;

first clutch means for delivering torque from said driving member to one torque input member of said gearing while said brake mans is applied to establish one gear ratio;

second clutch means for delivering torque from said driving member to another torque input member of said gearing while said brake means is applied to establish another gear ratio, said first and second clutch means being applied simultaneously while said brake means is released to establish a gear ratio intermediate said one gear ratio and said other gear ratio;

a fluid pressure accumulator means for cushioning application of said brake means during establishment of said one gear ratio and said other gear ratio, separate fluid pressure feed passage means and fluid pressure return passage means communicating with said first and second clutch means and with said brake means, and a calibrated flow control orifice in said pressure feed passage means for controlling engagement timing, the fluid return flow in said return passage means being unrestricted thereby effecting rapid disengagement of said first and second clutch means and said brake means.

11. A geared transmission for establishing torque flow paths from a driving member to a driven member comprising fluid pressure operated brake means for braking a reaction member that is common to each of two torque flow paths, each torque flow path having a discrete gear ratio;

first clutch means for delivering torque from said driving member to one torque input member of said transmission while said brake means is applied to establish one gear ratio;

second clutch means for delivering torque from said driving member to another torque input member of said transmission while said brake means is applied and said first clutch means is applied to establish another gear ratio;

said first and second clutch means both being applied while said brake means is released to establish a gear ratio intermediate said one gear ratio and said other gear ratio;

separate fluid pressure feed passage means and fluid pressure return passage means communicating with said first and second clutch means and with said brake means, and a calibrated flow control orifice in said pressure feed passage means for controlling engagement timing, the fluid return flow in said return passage means being unrestricted thereby effecting rapid disengagement of said first and second clutch means and said brake means.

12. An automatic transmission control system for a geared transmission having multiple forward gear ratios and a reverse gear ratio;

said gearing providing forward driving torque delivery paths and a reverse torque delivery path from a driving member to a driven member;

a control valve circuit including a pressure source, a regulator valve means for regulating said pressure source;

a forward drive clutch means for establishing and disestablishing a driving connection between said driving shaft and forward drive torque input elements of said gearing, a reverse drive clutch means for establishing and disestablishing a driving connection between said driving shaft and reverse drive torque input elements of said gearing, a low and reverse drive brake means for anchoring a reaction element of said gearing during reverse drive and during forward drive; and a manual valve means communicating with said regulator valve means for selectively distributing pressure to said low and reverse drive brake means and said reverse drive clutch means and to said low and reverse drive brake means and said forward drive clutch means;

said circuit including separate fluid pressure delivery passages between said manual valve means and each of said reverse drive clutch means and said low and reverse drive clutch means, the pressure delivery passage for said low and reverse drive brake means including a calibrated flow restricting orifice whereby said low and reverse drive clutch means becomes applied after application of said reverse drive clutch upon movement of said manual valve to the reverse drive position thus effecting cushioning and smooth engagement for said low and reverse drive brake means and said reverse drive clutch means.

13. The combination as set forth in claim 12 wherein said forward driving torque delivery paths include gearing elements defining an underdrive gear ratio and a direct drive ratio;

direct drive clutch means for establishing and disestablishing said direct ratio drive torque delivery path; and forward drive clutch means for establishing and disestablishing said underdrive ratio drive torque delivery path;

said manual valve means being adapted to pressurize at least one of said forward drive clutch means and said direct drive clutch means upon movement to a first position and to pressurize said reverse drive clutch means upon movement to a second position.

14. The combination as set forth in claim 13 wherein said circuit includes shift valve means defining in part a fluid connection between said manual valve means and said clutch means and brake means; and a pull-in valve means in fluid communication with said manual valve in fluid communication with said manual valve means and said shift valve means for shifting said shift valve means to an underdrive position upon manual movement of said manual valve means to a position corresponding to said underdrive ratio.

15. The combination as set forth in claim 14 wherein said circuit includes a shift signal source in fluid communication with said shift valve means;

a source of a regulated fluid supply pressure for said shift signal source;

said pull-in valve forming in part a fluid connection between said supply pressure source and said shift valve means whereby said shift valve means assumes an underdrive position upon movement of said manual valve means to said underdrive ratio position.

* * * * *